United States Patent
Okamura

(10) Patent No.: US 6,674,768 B1
(45) Date of Patent: *Jan. 6, 2004

(54) DATA TRANSMISSION DEVICE AND DATA TRANSMISSION METHOD CAPABLE OF MINIMIZING DELAY OF FAST DATA

(75) Inventor: Yusaku Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,161

(22) Filed: Oct. 8, 1999

(30) Foreign Application Priority Data

Oct. 9, 1998 (JP) .......................................... 10-288549

(51) Int. Cl.⁷ .................................................. H04J 3/16
(52) U.S. Cl. ........................ 370/468; 370/441; 370/493; 370/474; 370/412; 370/329; 375/220; 375/296; 375/377
(58) Field of Search ................................ 370/210, 264, 370/419, 463, 470–474, 476, 477, 480, 343–344; 375/220, 285, 296, 222, 377

(56) References Cited

U.S. PATENT DOCUMENTS

| | | | |
|---|---|---|---|
| 3,700,820 A | 10/1972 | Blasbalg et al. | ......... 179/15 BV |
| 5,825,826 A | * 10/1998 | May et al. | .................. 375/295 |

(List continued on next page.)

FOREIGN PATENT DOCUMENTS

| | | |
|---|---|---|
| JP | 10-303872 | 11/1998 |
| WO | WO 97/03506 | 1/1997 |

OTHER PUBLICATIONS

Y. Okamura et al., "Optimization of xDSL Transmission Systems", pp. 1315–1319, 1999 IEEE International Conference on Communications, vol. 2, Jun. 6–10, 1999.

Y. Okamura et al., "ADSL System for Time Periodic Noise Environments", pp. 64–69, NEC Research and Development, vol. 40, No. 1, Jan. 1999.

K. Sistanizadeh, "Spectral Compatibility of Asymmetrical Digital Subscriber Lines (ADSL) with basic rate DSLs, HDSLs, and T1 lines", pp. 1969–1973, IEEE Global Telecommmunications Conference, vol. 3, Dec. 2–5, 1991.

* cited by examiner

Primary Examiner—Douglas Olms
Assistant Examiner—Van Nguyen
(74) Attorney, Agent, or Firm—Young & Thompson

(57) ABSTRACT

A data transmission device for executing data transmission in environments where the noise level changes periodically minimizes delay of fast data. A multiplexing/synchronization control section receives data (in which the ratio between fast data and interleave data is fixed) which are supplied from an upper layer device at a prespecified data rate, and separates the data into fast data and interleave data. The fast data is supplied to a tone ordering section without changing its data rate. Meanwhile, an interleaving section executes interleaving to the interleave data, and a rate converter controls the data rate of the interleave data and supplies the interleave data to the tone ordering section. The tone ordering section assigns the fast data and the interleave data to each carrier of a symbol (frame) to be transmitted, based on preobtained bit distribution with respect to low noise periods or high noise periods, depending on whether the symbol is transmitted in the low noise periods or in periods including the high noise periods. In the data assignment, the amount of fast data included in each symbol is set constant regardless of whether the symbol is transmitted in the low noise periods or in periods including the high noise periods, thereby the amount of fast data transmitted in a fixed time period is made constant, and thus delay of fast data is minimized.

15 Claims, 14 Drawing Sheets

U.S. PATENT DOCUMENTS

| | | | | |
|---|---|---|---|---|
| 6,009,122 A | * | 12/1999 | Chow | 375/260 |
| 6,128,335 A | * | 10/2000 | Liu et al. | 375/220 |
| 6,128,349 A | * | 10/2000 | Chow | 375/260 |
| 6,144,695 A | * | 11/2000 | Helms et al. | 375/222 |
| 6,167,079 A | * | 12/2000 | Kinnunen et al. | 375/225 |
| 6,167,375 A | * | 12/2000 | Miseki et al. | 704/229 |
| 6,205,220 B1 | * | 3/2001 | Jacobsen et al. | 379/417 |
| 6,229,855 B1 | * | 5/2001 | Takatori et al. | 375/296 |
| 6,266,347 B1 | * | 7/2001 | Amrany et al. | 370/478 |
| 6,292,515 B1 | * | 9/2001 | Kao et al. | 375/260 |
| 6,480,976 B1 | * | 11/2002 | Pan et al. | 714/701 |
| 6,484,138 B2 | * | 11/2002 | DeJaco | 704/221 |
| 2002/0075902 A1 | * | 6/2002 | Abbas et al. | 370/474 |
| 2002/0159457 A1 | * | 10/2002 | Zhang et al. | 370/391 |

FIG. 8 PRIOR ART

| TTR | | | | | | | | | | |
|---|---|---|---|---|---|---|---|---|---|---|
| 0 | 0 | 1 | 2 | 3 | 4 | 5 | 6 | 7 | 8 | 9 |
| 1 | 10 | 11 | 12 | 13 | 14 | 15 | 16 | 17 | 18 | 19 |
| 2 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 |
| 4 | 41 | 42 | 43 | 44 | 45 | 46 | 47 | 48 | 49 | 50 |
| 5 | 51 | 52 | 53 | 54 | 55 | 56 | 57 | 58 | 59 | 60 |
| 6 | 61 | 62 | 63 | 64 | 65 | 66 | 67 | 68 | 69 | 70 |
| 7 | 71 | 72 | 73 | 74 | 75 | 76 | 77 | 78 | 79 | 80 |
| 8 | 81 | 82 | 83 | 84 | 85 | 86 | 87 | 88 | 89 | 90 |
| 9 | 91 | 92 | 93 | 94 | 95 | 96 | 97 | 98 | 99 | 100 |
| 10 | 101 | 102 | 103 | 104 | 105 | 106 | 107 | 108 | 109 | 110 | 111 |
| 11 | 112 | 113 | 114 | 115 | 116 | 117 | 118 | 119 | 120 | 121 |
| 12 | 122 | 123 | 124 | 125 | 126 | 127 | 128 | 129 | 130 | 131 |
| 13 | 132 | 133 | 134 | 135 | 136 | SS | 138 | 139 | 140 | 141 |
| 14 | 142 | 143 | 144 | 145 | 146 | 147 | 148 | 149 | 150 | 151 |
| 15 | 152 | 153 | 154 | 155 | 156 | 157 | 158 | 159 | 160 | 161 |
| 16 | 162 | 163 | 164 | 165 | 166 | 167 | 168 | 169 | 170 | 171 | 172 |
| 17 | 173 | 174 | 175 | 176 | 177 | 178 | 179 | 180 | 181 | 182 |
| 18 | 183 | 184 | 185 | 186 | 187 | 188 | 189 | 190 | 191 | 192 |
| 19 | 193 | 194 | 195 | 196 | 197 | 198 | 199 | 200 | 201 | 202 |
| 20 | 203 | 204 | 205 | SS | 207 | 208 | 209 | 210 | 211 | 212 |
| 21 | 213 | 214 | 215 | 216 | 217 | 218 | 219 | 220 | 221 | 222 |
| 22 | 223 | 224 | 225 | 226 | 227 | 228 | 229 | 230 | 231 | 232 |
| 23 | 233 | 234 | 235 | 236 | 237 | 238 | 239 | 240 | 241 | 242 | 243 |
| 24 | 244 | 245 | 246 | 247 | 248 | 249 | 250 | 251 | 252 | 253 |
| 25 | 254 | 255 | 256 | 257 | 258 | 259 | 260 | 261 | 262 | 263 |
| 26 | 264 | 265 | 266 | 267 | 268 | 269 | 270 | 271 | 272 | 273 |
| 27 | 274 | SS | 276 | 277 | 278 | 279 | 280 | 281 | 282 | 283 |
| 28 | 284 | 285 | 286 | 287 | 288 | 289 | 290 | 291 | 292 | 293 |
| 29 | 294 | 295 | 296 | 297 | 298 | 299 | 300 | 301 | 302 | 303 |
| 30 | 304 | 305 | 306 | 307 | 308 | 309 | 310 | 311 | 312 | 313 | 314 |
| 31 | 315 | 316 | 317 | 318 | 319 | 320 | 321 | 322 | 323 | 324 |
| 32 | 325 | 326 | 327 | 328 | 329 | 330 | 331 | 332 | 333 | 334 |
| 33 | 335 | 336 | 337 | 338 | 339 | 340 | 341 | 342 | 343 | SS |

- SS INVERSE SYNC SYMBOL
- SS FEXT SYNC SYMBOL
- SS NEXT SYNC SYMBOL
- FEXT DATA SYMBOL
- NEXT DATA SYMBOL

FIG. 11
4-BIT CONSTELLATION
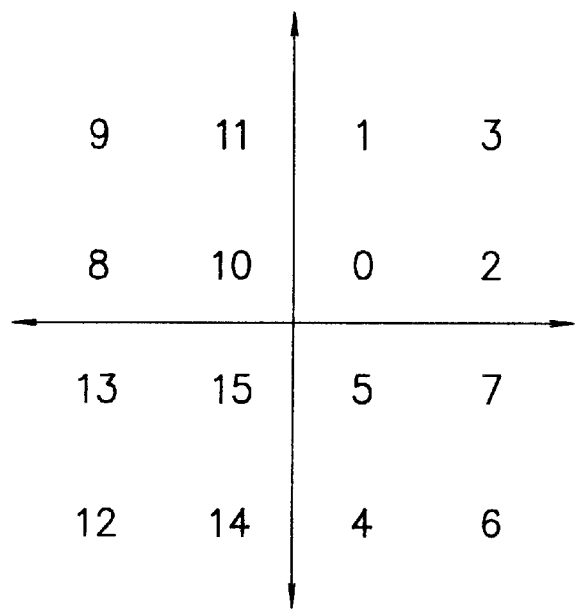
5-BIT CONSTELLATION
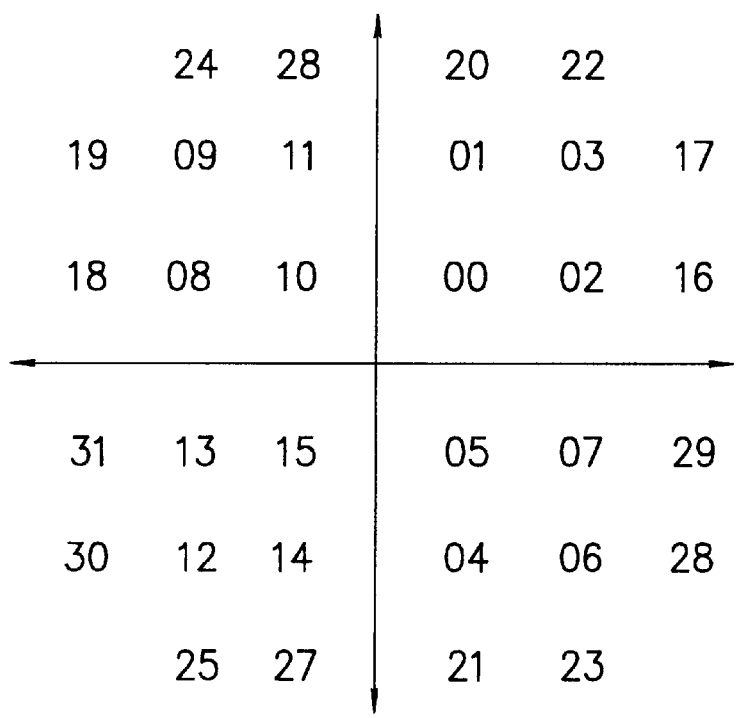

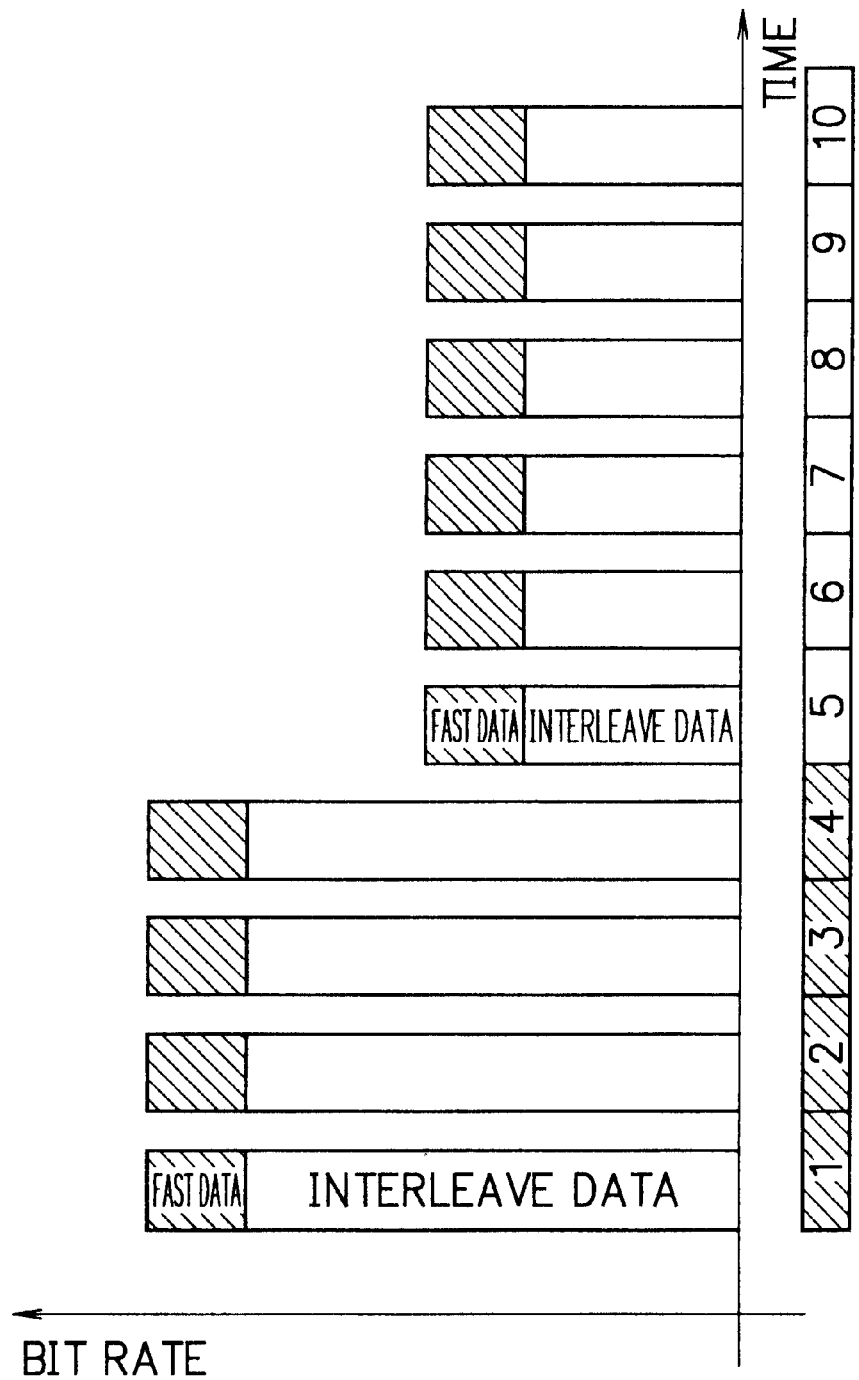
F I G. 14

DATA TRANSMISSION DEVICE AND DATA TRANSMISSION METHOD CAPABLE OF MINIMIZING DELAY OF FAST DATA

BACKGROUND OF THE INVENTION

The present invention relates to a data transmission device and a data transmission method, and in particular, to a data transmission device and a data transmission method which are applied to XDSL (X Digital Subscriber Line (X: A, S, V, etc.)) which realizes high speed data transmission of the order of Mbit/s by use of metal cables such as telephone lines.

1. Description of the Prior Art

These days, techniques concerning XDSL (X Digital Subscriber Line: (X: A (Asymmetric), S (Symmetric), V (Very high speed), etc.)) for realizing high speed data transmission of the order of Mbit/s via metal cables such as telephone lines are attracting attention. Most of all, ADSL (Asymmetric Digital Subscriber Line), whose bit rate asymmetry between upstream data transmission and downstream data transmission is suitable for the access to the Internet, is receiving much attention.

In an ADSL transceiver unit, digital signals are converted to analog signals according to a modulation/demodulation method called DMT (Discrete Multi-Tone), and the analog signals are transmitted by the ADSL transceiver unit. In the DMT method, modulation according to QAM (Quadrature Amplitude Modulation) is executed to 256 carriers, and the modulated carriers are multiplexed together by means of IDFT (Inverse Discrete Fourier Transform), and the multiplexed signal is transmitted. On the receiving side, each modulated carrier is extracted from the multiplexed signal by means of DFT (Discrete Fourier Transform), and each QAM-modulated carrier is demodulated, and thereby high speed data transmission is implemented.

However, in the case of the ADSL transceiver unit, if a cable used for ADSL (an ADSL cable) is included in a cable bundle that also includes an ISDN (Integrated Services Digital Network) cable, noise is caused in the ADSL cable due to a variety of effects of the ISDN cable and thereby the transmission bit rate of the ADSL cable is necessitated to be deteriorated. Most of all, crosstalk noise from the ISDN cable has a large effect on the ADSL cable.

In the following, the crosstalk noise which occurs to the ADSL transceiver unit in the case where a TCM(Time Compression Multiplex)-ISDN line is placed adjacent to an ADSL line will be explained referring to FIG. 1. FIG. 1 shows crosstalk noise which occurs to an ADSL terminal ATU-R (ADSL Transceiver Unit at the Remote end) due to data transmission on the TCM-ISDN line when downstream data transmission is being executed on the ADSL line.

In the TCM-ISDN, upstream data transmission (1.25 msec) and downstream data transmission (1.25 msec) are alternately executed. If upstream data transmission on the TCM-ISDN line is executed when downstream data transmission is being executed on the ADSL line, high power signals on the TCM-ISDN line before attenuation exert effects on attenuated signals on the ADSL line, and thereby NEXT (Near End X(cross)-Talk) occurs to the terminal ATU-R. If downstream data transmission on the TCM-ISDN line is executed when downstream data transmission is being executed on the ADSL line, signals on the TCM-ISDN line exert effects on attenuated signals on the ADSL line, and thereby FEXT (Far End X(cross)-Talk) occurs to the terminal ATU-R. Incidentally, the same effects also occur on the side of the central office ATU-C (ADSL Transceiver Unit at the Central office).

FIG. 2 is a schematic diagram showing noise levels of the NEXT and the FEXT. As shown in FIG. 2, the noise level of NEXT is higher than that of FEXT, since high power signals on the TCM-ISDN line before attenuation exert effects on attenuated signals on the ADSL line in the case of NEXT. There has been proposed a data transmission method which pays attention to the difference of the noise level, in which the data rate; (data transmission bit rate) in FEXT periods (i.e. periods in which the lower noise due to the FEXT occurs) is set larger than the data rate in NEXT periods (i.e. periods in which the higher noise due to the NEXT occurs) as shown in the bottom of FIG. 2. Such a method is called "dual bit-map method".

Since the noise level changes periodically in the ADSL transceiver unit as mentioned above, generally, the SNR (Signal to Noise Ratio) of each carrier through the ADSL line is measured both in the upstream data transmission and in the downstream data transmission of the TCM. ISDN line (that is, both in the NEXT periods and in the FEXT periods), and thereby bit distribution and gain distribution onto the carriers are determined with respect to FEXT periods and with respect to NEXT periods, based on the SNR. FIG. 3 shows an example of such bit distribution. In FIG. 3, the horizontal axis denotes the frequency of each carrier to be used for the data transmission, and the frequency difference between adjacent carriers is 4.3125 kHz, and the number of carriers is 256. Each carrier is modulated when data is transmitted. The SNR of each carrier is evaluated in the NEXT periods and in the FEXT periods, as a result of transmission of a pseudo random signal which will be described below. Thereafter, actual data transmission is executed according to the bit distribution and the gain distribution which have been determined based on the measurement of the SNR.

In the following, a concrete example of the SNR evaluation and the bit/gain distribution calculation will be described referring to FIG. 3 through FIG. 5. FIG. 4 is a block diagram showing an example of an ADSL data communication system. Referring to FIG. 4, an ATU-C 21 is provided to the system as the central office, and an ATU-R 22 is provided to the system as a terminal. The ATU-C 21 includes a transmission section 23A and a reception section 24A, and the ATU-R 22 includes a transmission section 23B and a reception section 24B.

FIG. 5 is a block diagram showing the composition of the ATU-C 21 and the ATU-R 22 of the ADSL data communication system of FIG. 4. The ATU-C 21 on the left-hand side of FIG. 5 includes the transmission section 23A, the reception section 24A, a pseudo random signal generation section 25A, an SNR measurement section 26A, a bit/gain distribution calculation section 27A and a bit/gain distribution table 28A. The transmission section 23A includes an IDFT (Inverse Discrete Fourier Transform) section 10A, and the reception section 24A includes a DFT (Discrete Fourier Transform) section 29A. Similarly, the ATU-R 22 on the right-hand side of FIG. 5 includes the transmission section 23B, the reception section 24B, a pseudo random signal generation section 25B, an SNR measurement section 26B, a bit/gain distribution calculation section 27B and a bit/gain distribution table 28B. The transmission section 23B includes an IDFT section 10B, and the reception section 24B includes a DFT section 29B.

In the ATU-C 21, the pseudo random signal generation section 25A generates a pseudo random signal which includes all the carriers (256 carriers according to the standard of ANSI (American National Standards Institution), for example) and sends the pseudo random signal to the IDFT section 10A of the transmission section 23A so as to be transmitted to the ATU-R 22. The SNR measurement section 26A calculates the SNR of each carrier of a pseudo random signal supplied from the ATU-R 22, with respect to the FEXT periods and the NEXT periods. The bit/gain distribution calculation section 27A calculates and determines the bit distribution and the gain distribution of the carriers with respect to the. FEXT periods and the NEXT periods, based on the SNR of each carrier in the FEXT periods and the SNR of each carrier in the NEXT periods which have been obtained by the SNR measurement section 26A. The bit/gain distribution table 28A receives bit distribution and gain distribution of the carriers which have been calculated and determined by the bit/gain distribution calculation section 27B of the ATU-R 22, and stores the bit distribution and the gain distribution.

In the ATU-R 22, the pseudo random signal generation section 25B generates a pseudo random signal which includes all the carriers and sends the pseudo random signal to the IDFT section 10B of the transmission section 23B so as to be transmitted to the ATU-C 21. The SNR measurement section 26B calculates the SNR of each carrier of a pseudo random signal supplied from the ATU-C 21, with respect to the FEXT periods and the NEXT periods. The bit/gain distribution calculation section 27B calculates and determines the bit distribution and the gain distribution of the carriers with respect to the FEXT periods and the NEXT periods, based on the SNR of each carrier in the FEXT periods and the SNR of each carrier in the NEXT periods which have been obtained by the SNR measurement section 26B. The bit/gain distribution table 28B receives bit distribution and gain distribution of the carriers which have been calculated and determined by the bit/gain distribution calculation section 27A of the ATU-C 21, and stores the bit distribution and the gain distribution.

In the following, an example of a process executed by the ADSL data communication system of FIG. 5 for determining the bit distribution and the gain distribution onto the carriers in downstream data transmission will be explained referring to FIG. 5. First, the ATU-C 21 outputs a pseudo random signal from its pseudo random signal generation section 25A for obtaining the bit distribution and the gain distribution of the carriers in the downstream data transmission. The pseudo random signal outputted by the pseudo random signal generation section 25A is supplied to the IDFT section 10A of the transmission section 23A and IDFT (Inverse Discrete Fourier Transform) is executed to the pseudo random signal by the IDFT section 10A. The pseudo random signal to which the IDFT has been executed is transmitted to the ATU-R 22 via the ADSL line. The pseudo random signal (to which the IDFT has been executed and which has been transferred to the ATU-R 22) is received by the reception section 24B of the ATU-R 22, and the signal is supplied to the DFT section 29B. The DFT section 29B executes DFT (Discrete Fourier Transform) to the pseudo random signal (to which the IDFT has been executed and which has been transferred to the ATU-R 22) and thereby obtains a received pseudo random signal which includes all the carriers (256 carriers, for example). The received pseudo random signal is supplied to the SNR measurement section 26B. The SNR measurement section 26B obtains the SNR of each carrier based on the received pseudo random signal including all the carriers, with respect to NEXT periods and FEXT periods. The SNR of each carrier with respect to NEXT periods and the SNR of each carrier with respect to FEXT periods which have been measured by the SNR measurement section 26B are supplied to the bit/gain distribution calculation section 27B, therefore, the bit/gain distribution calculation section 27B receives 512 SNRs (256×2), for example. In the bit/gain distribution calculation section 27B, the bit distribution and the gain distribution of the carriers are calculated with respect to NEXT periods and FEXT periods as shown in FIG. 3. The bit/gain distribution information of the carriers with respect to NEXT periods and FEXT periods which has been obtained by the bit/gain distribution calculation section 27B is transmitted by the transmission section 23B to the ATU-C 21 via the ADSL line. The ATU-C 21 which received the bit/gain distribution information via the ADSL line stores the bit/gain distribution in the bit/gain distribution table 28A. The above process for determining the bit/gain distribution is executed in initialization (when data communication is started, for example), in the fast retraining period (defined in ITU standard), etc.

In the following, an ATU (ADSL Transceiver Unit) transmitter for transmitting data according to the bit/gain distribution obtained by the above process will be described referring to FIG. 6. FIG. 6 is a block diagram showing the composition of a conventional ATU transmitter. Incidentally, the ATU transmitter of FIG. 6 is a device which corresponds to the transmission section (23A or 23B) of the ATU (ADSL Transceiver Unit) (21 or 22) shown in FIG. 5.

The ATU transmitter shown in FIG. 6 includes a multiplexing/synchronization control section 30, a fast data CRC (Cyclic Redundancy Check) section 31, scrambling/error correction sections 32 and 35, an interleave data CRC section 34, an interleaving section 36, rate converters 33 and 37, a tone ordering section 38, a constellation encoding/gain scaling section 39, and an IDFT (Inverse Discrete Fourier Transform) section 40.

The ATU transmitter is provided with two types of channels: a fast channel which is suitable for communication of data such as video data, voice data, data for real-time application software, etc. to which delay is harmful, and an interleave channel which is suitable for data communication such as file transfer to which delay is not so harmful but burst error is very harmful. The difference between the two types of channels is the presence or absence of interleaving process, in which the order of transmitted data is changed and thereby the effects of the burst error is decreased. In the interleave channel, even if burst error occurred due to impulse noise etc., the receiving side of the interleave channel restores the order of the rearranged data into the original order and thereby the burst error is spread out, and thus the data can be correctly restored by error correction. However, data have to be temporarily stored in the interleaving process, and thus delay is caused in the interleave process.

In the following, the operation of the ATU transmitter of FIG. 6 will be explained briefly. Data (in which the ratio between the amount of fast data and the amount of interleave data is generally fixed according to initial settings) are supplied from an upper layer device (such as a computer) to the ATU transmitter at a prespecified data rate, and are separated by the multiplexing/synchronization control section 30 into fast data and interleave data. The fast data are supplied to a fast path (the upper path in FIG. 6) and the interleave data are supplied to an interleave path (the lower path in FIG. 6). In the fast path, the fast data CRC section 31 adds CRC code to the fast data. The scrambling/error correction section 32 scrambles the fast data supplied from the fast data CRC section 31, adds Reed-Solomon error correction code to the scrambled fast data, and supplies the data to the rate converter 33. Also in the interleave path, the interleave data CRC section 34 adds CRC code to the interleave data, and the scrambling/error correction section 35 executes the scrambling and the addition of error correction code. Thereafter, the interleaving section 36 in the interleave path changes the order of the interleave data supplied from the scrambling/error correction section 35 and thereby executes the interleaving, and sends the interleaved data to the rate converter 37.

Each of the rate converters 33 and 37 recognizes change of the noise level due to the TCM-ISDN line by use of a TTR (TCM-ISDN Timing Reference) signal which is in sync with the change of data transmission direction in the TCM-ISDN line. Thereby, the rate converter (33, 37) increases the amount of data to be supplied to the tone ordering section 38 so as to raise the data rate in periods in which the noise due to the TCM-ISDN line is low (i.e. in the FEXT periods). In periods in which the noise due to the TCM-ISDN line is high (i.e. in the NEXT periods), the rate converter (33, 37) decreases the amount of data to be supplied to the tone ordering section 38 so as to lower the data rate.

The tone ordering section 38 obtains information concerning the number of bits to be assigned to each carrier, by use of the bit distribution information of the carriers which is supplied from the bit/gain distribution table, and determines fast data and interleave data to be assigned to each carrier. In the constellation encoding/gain scaling section 39, the data assigned by the tone ordering section 38 to each carrier is converted into constellation position information using a constellation, and thereby corresponding Fourier transform coefficients are obtained. The Fourier transform coefficients with respect to each carrier are supplied to the IDFT section 40. The IDFT section 40 which received the 512 Fourier transform coefficients with respect to the 256 carriers executes IDFT (Inverse Discrete Fourier Transform) to the coefficients and thereby obtains a voltage signal V(t) which varies in time. The IDFT section 40 outputs 512 sampled voltages of the voltage signal V(t) (i.e. V(t) corresponding to 512 times "t" in a symbol cycle) successively to the ADSL line.

FIG. 7 is a bar graph showing the ratio between the fast data and the interleave data which are assigned to each symbol (frame), in the case where data transmission is executed according to the dual bit-map method which has been described above. In FIG. 7, each bar corresponds to a symbol (frame), in which all the 256 carriers are included. The FEXT/NEXT cycle (2.5 msec) of the TCM-ISDN line corresponds to (10+α) symbols. As shown in FIG. 7, the amount of data to be assigned to a symbol is increased in the period in which the noise is low (in the FEXT period on the left-hand side of the graph), and is decreased in the period in which the noise is high (in the NEXT period on the right-hand side of the graph). However in FIG. 7, the ratio between the fast data and the interleave data assigned to one symbol is fixed, regardless of whether the noise is high or low.

In the data transmission according to the dual bit-map method, in the 2.5 msec FEXT/NEXT cycle (upstream/downstream data transmission cycle) of the TCM-ISDN line, the number of symbols in which the amount of transmitted data can be set large (hereafter, referred to as "FEXT symbols") and the number of symbols in which the amount of transmitted data has to be set small (hereafter, referred to as "NEXT symbols") can not be fixed, since the 2.5 msec FEXT/NEXT cycle of the TCM-ISDN line corresponds to (10+α (not an integer)) symbols on the ADSL line.

The phenomenon will be explained more concretely referring to FIG. 8. FIG. 8 shows the timing when the data transmission direction is changed in the TCM-ISDN line, and symbols which are transmitted by the ADSL transceiver unit in each FEXT/NEXT cycle of the TCM-ISDN line. Symbols shown on the left-hand side of FIG. 8 are the FEXT symbols which can carry larger amount of data because of the low noise due to the FEXT from the TCM-ISDN line, and symbols shown on the right-hand side of FIG. 8 are the NEXT symbols which can carry smaller amount of data because of the high noise due to the NEXT from the TCM-ISDN line. As shown in FIG. 8, a little and various difference occurs between the timing when the data transmission direction is changed in the TCM-ISDN line and the timing when the amount of data transmitted by the ADSL line is changed based on the TTR signal in each FEXT/NEXT cycle. Therefore, the number of FEXT symbols which can be transmitted by the ATU transmitter in each FEXT/NEXT cycle of the TCM-ISDN line changes between 3 and 4 as shown in FIG. 8.

In the ADSL transceiver unit, the bit rate of data which are supplied from the upper layer device is fixed. Therefore, if the number of the FEXT symbols in a FEXT/NEXT cycle changes between 3 and 4, the amount of data which can be transmitted in a fixed cycle is necessitated to be changed, and thus data are required to be temporarily stored in the rate converter. The storage in the rate converter causes additional delay.

Further, in the conventional dual bit-map method, the ratio between fast data and interleave data which are assigned to one symbol is fixed as shown in FIG. 7, regardless of whether the noise is high or low (that is, regardless of whether the symbol is a FEXT symbol or a NEXT symbol). Therefore, the amount of fast data which are transmitted in a fixed time period changes in time, and thereby delay is necessitated to be caused in the transmission of fast data due to buffering (temporarily storing data), even though delay is harmful to the fast data such as video data,i voice data, data for real-time application software, etc.

SUMMARY OF THE INVENTION

It is therefore the primary object of the present invention to provide a data transmission device and a data transmission device, by which the delay of the fast data can be minimized.

In accordance with a first aspect of the present invention, there is provided a data transmission device which executes data transmission in environments where the noise level changes periodically. By the data transmission device, data transmission is executed setting the amount of fast data which are assigned to each frame at a constant amount even if the amount of data which can be assigned to each frame changed due to the periodic change of the noise level.

In accordance with a second aspect of the present invention, in the first aspect, the amount of interleave data which are assigned to each frame to be transmitted is controlled, based on the change of the amount of data which are assigned to each frame due to the periodic change of the noise level.

In accordance with a second aspect of the present invention, in the first aspect, the data transmission device is a device which executes data transmission using multi-carrier, comprising a separation means, an interleaving means, an interleave data rate control means, a tone ordering means, a coefficient conversion means and a transform means. The separation means receives data which are supplied from an upper layer device at a fixed data rate including fast data and interleave data at a prespecified ratio, and separates the data into the fast data and the interleave data. The interleaving means executes interleaving to the interleave data which have been separated by the separation means. The interleave data rate control means controls the data rate of the interleave data according to the periodic change of the noise level. The tone ordering means assigns the fast data to the carriers of the frame starting from a carrier that can carry the smallest number of bits so that the amount of the fast data included in the frame will be the constant amount, and assigns the interleave data to the carriers of the frame starting from a carrier that can carry the largest number of bits. The data assignment is executed based on preobtained bit distribution of the multi-carrier with respect to low noise periods or with respect to high noise periods, depending on whether the frame is a frame that is transmitted in the low noise periods or a frame that is transmitted in periods including the high noise periods. The coefficient conversion means converts data which have been assigned by the tone ordering means to each carrier of the frame into corresponding coefficients, based on the preobtained bit distribution and preobtained gain distribution of the multi-carrier with respect to the low noise periods or with respect to the high noise periods depending on whether the frame is a frame that is transmitted in the low noise periods or a frame that is transmitted in periods including the high noise periods. The, transform means transforms the coefficients with respect to the carriers of the frame into a signal which varies in time.

In accordance with a fourth aspect of the present invention, in the third aspect, the transform means is an IDFT (Inverse Discrete Fourier Transform) means for executing inverse discrete Fourier transform to Fourier transform coefficients with respect to the carriers of the frame which have been obtained by the coefficient conversion means and thereby obtaining the signal which varies in time.

In accordance with a fifth aspect of the present invention, in the third aspect, the data transmission device further comprises a fast data CRC (Cyclic Redundancy Check) means, a first scrambling/error correction means, an interleave data CRC means and a second scrambling/error correction means. The fast data CRC means executes the cyclic redundancy check and adds CRC code to the fast data which have been separated by the separation means. The first scrambling/error correction means scrambles the fast data supplied from the fast data CRC means and adds error correction code to the scrambled fast data. The interleave data CRC means executes the cyclic redundancy check and adds CRC code to the interleave data which have been separated by the separation means. The second scrambling/ error correction means scrambles the interleave data supplied from the interleave data CRC means and adds error correction code to the scrambled interleave data.

In accordance with a sixth aspect of the present invention, in the first aspect, the data transmission device is an ATU (ADSL (Asymmetric Digital Subscriber Line) Transceiver Unit) transmitter which is used as a data transmitter of an ATU (ADSL Transceiver Unit).

In accordance with a seventh aspect of the present invention, there is provided a data transmission method for transmitting data in environments where the noise level changes periodically. In the data transmission method, data transmission is executed setting the amount of fast data which are assigned to each frame at a constant amount even if the amount of data which can be assigned to each frame changed due to the periodic change of the noise level.

In accordance with an eighth aspect of the present invention, in the seventh aspect, the amount of interleave data which are assigned to each frame to be transmitted is controlled, based on the change of the amount of data which are assigned to each frame due to the periodic change of the noise level.

In accordance with a ninth aspect of the present invention, in the seventh aspect, the data transmission is executed using multi-carrier. The data transmission method comprises a separation step, an interleaving step, an interleave data rate control step, a tone ordering step, a coefficient conversion step and a transform step. In the separation step, data, which are supplied from an upper layer device at a fixed data rate including fast data and interleave data at a prespecified ratio, are separated into the fast data and the interleave data. In the interleaving step, interleaving is executed to the interleave data which have been separated in the separation step. In the interleave data rate control step, the data rate of the interleave data is controlled according to the periodic change of the noise level. In the tone ordering step, the fast data are assigned to the carriers of the frame starting from a carrier that can carry the smallest number of bits so that the amount of the fast data included in the frame will be the constant amount, and the interleave data are assigned to the carriers of the frame starting from a carrier that can carry the largest number of bits. The data assignment is executed based on preobtained bit distribution of the multi-carrier with respect to low noise periods or with respect to high noise periods, depending on whether the frame is a frame that is transmitted in the low noise periods or a frame that is transmitted in periods including the high noise periods. In the coefficient conversion step, data which have been assigned to each carrier of the frame in the tone ordering step are converted into corresponding coefficients, based on the preobtained bit distribution and preobtained gain distribution of the multi-carrier with respect to the low noise periods or with respect to the high noise periods depending on whether the frame is a frame that is transmitted in the low noise periods or a frame that is transmitted in periods including the high noise periods. In the transform step, the coefficients with respect to the carriers of the frame are transformed into a signal which varies in time.

In accordance with a tenth aspect of the present invention, in the ninth aspect, the transform step is an IDFT (Inverse Discrete Fourier Transform) step in which inverse discrete Fourier transform is executed to Fourier transform coefficients with respect to the carriers of the frame which have been obtained in the coefficient conversion step and thereby the :signal which varies in time is obtained.

In accordance with an eleventh aspect of the present invention, in the ninth aspect, the data transmission method further comprises a fast data CRC (Cyclic Redundancy Check) step, a first scrambling/error correction step, an interleave data CRC step and a second scrambling/error correction step. In the fast data CRC step, the cyclic redundancy check and addition of CRC code are executed to the fast data which have been separated in the separation step. In the first scrambling/error correction step, the fast data as the result of the fast data CRC step are scrambled and error correction code is added to the scrambled fast data. In the interleave data CRC step, the cyclic redundancy check and addition of CRC code are executed to the interleave data which have been separated in the separation step. In the second scrambling/error correction step, the interleave data as the result of the interleave data CRC step are scrambled and error correction code is added to the scrambled interleave data.

In accordance with a twelfth aspect of the present invention, in the seventh aspect, the data transmission method is applied to an ATU (ADSL (Asymmetric Digital Subscriber Line) Transceiver Unit) transmitter which is used as a data transmitter of an ATU (ADSL Transceiver Unit).

In accordance with thirteenth through eighteenth aspects of the present invention, there are provided computer-readable record mediums storing programs for instructing a computer or a DSP (Digital Signal Processor) of a data transmission device to execute the data transmission methods of the seventh through twelfth aspects.

BRIEF DESCRIPTION OF THE DRAWINGS

The objects and features of the present invention will become more apparent from the consideration of the following detailed description taken in conjunction with the accompanying drawings, in which:

FIG. 8 is a timing chart showing the timing when the data transmission direction is changed in the TCM-ISDN line, and symbols which are transmitted by the ADSL transceiver unit in each FEXT/NEXT cycle of the TCM-ISDN line;

FIG. 11 is a schematic diagram showing two examples of constellations: a 4-bit constellation and a 5-bit constellation;

FIG. 14 is a bar graph showing the assignment of fast data and interleave data to each symbol which is executed by the ATU transmitter according to the embodiment of the present invention.

DESCRIPTION OF THE PREFERRED EMBODIMENTS

Figure 1:
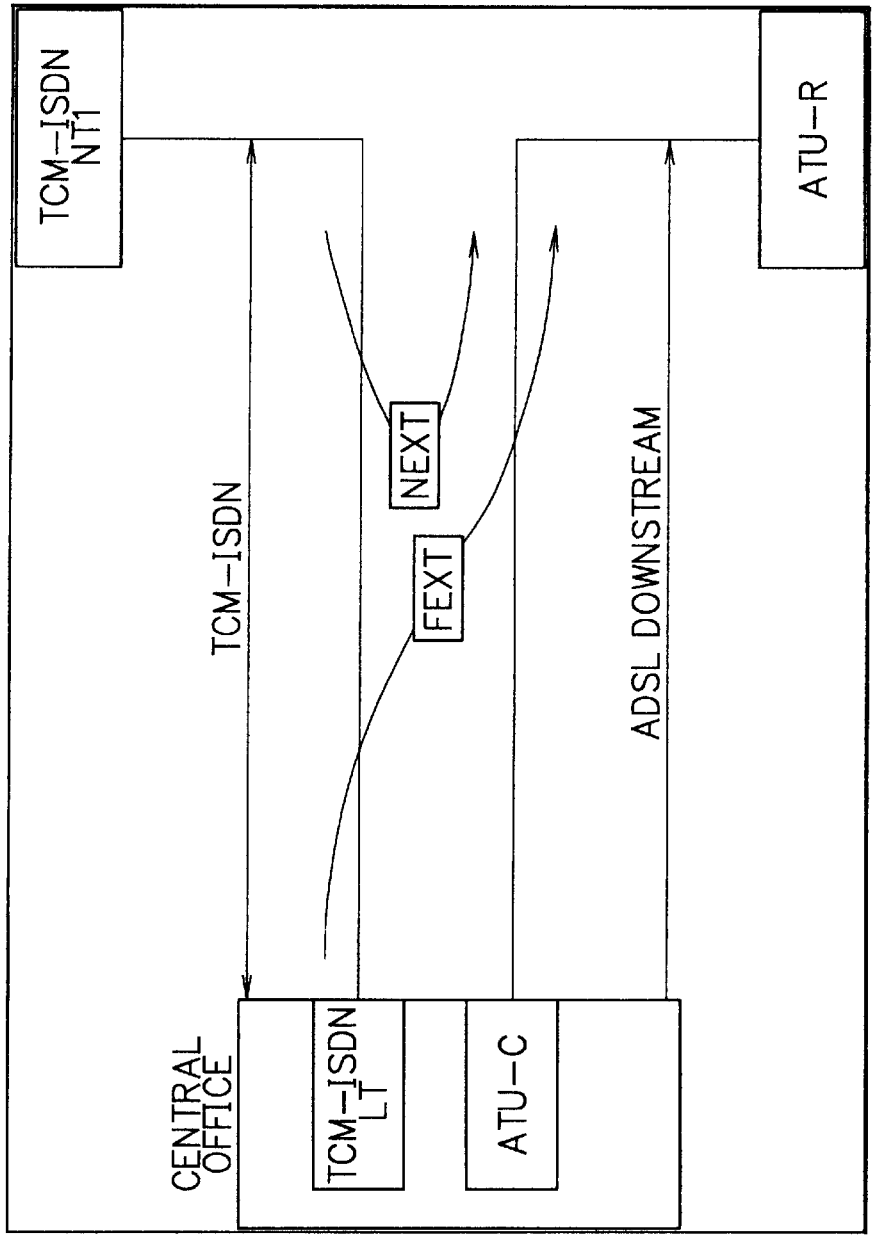
FIG. 1 is a schematic diagram for explaining crosstalk noise which occurs to an ATU-R (ADSL Transceiver Unit at the. Remote end) due to data transmission on a TCM-ISDN line when downstream data transmission is being executed on an ADSL line.
Figure 2:
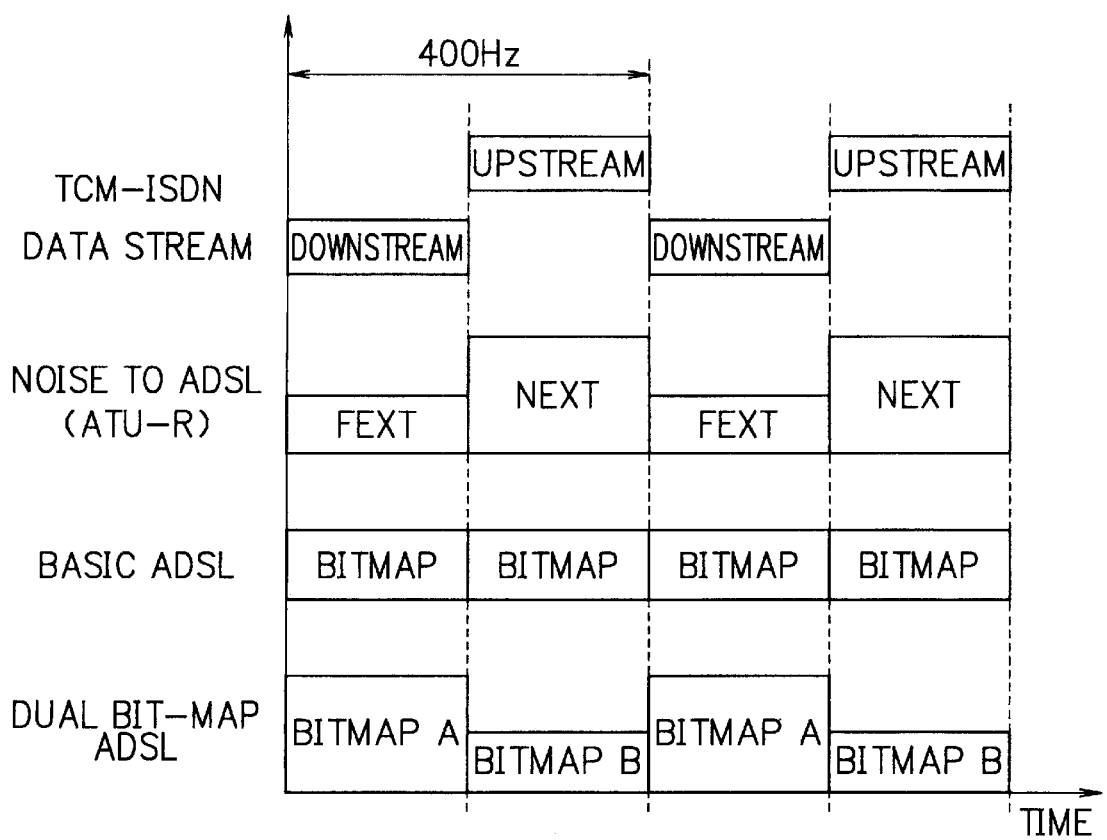
FIG. 2 is a schematic diagram showing noise levels of NEXT (Near End X(cross)-Talk) and FEXT (Far End X(cross)-Talk) and explaining the dual bit-map method.

Referring now to the drawings, a description will be given in detail of preferred embodiments in accordance with the present invention.

Figure 9:
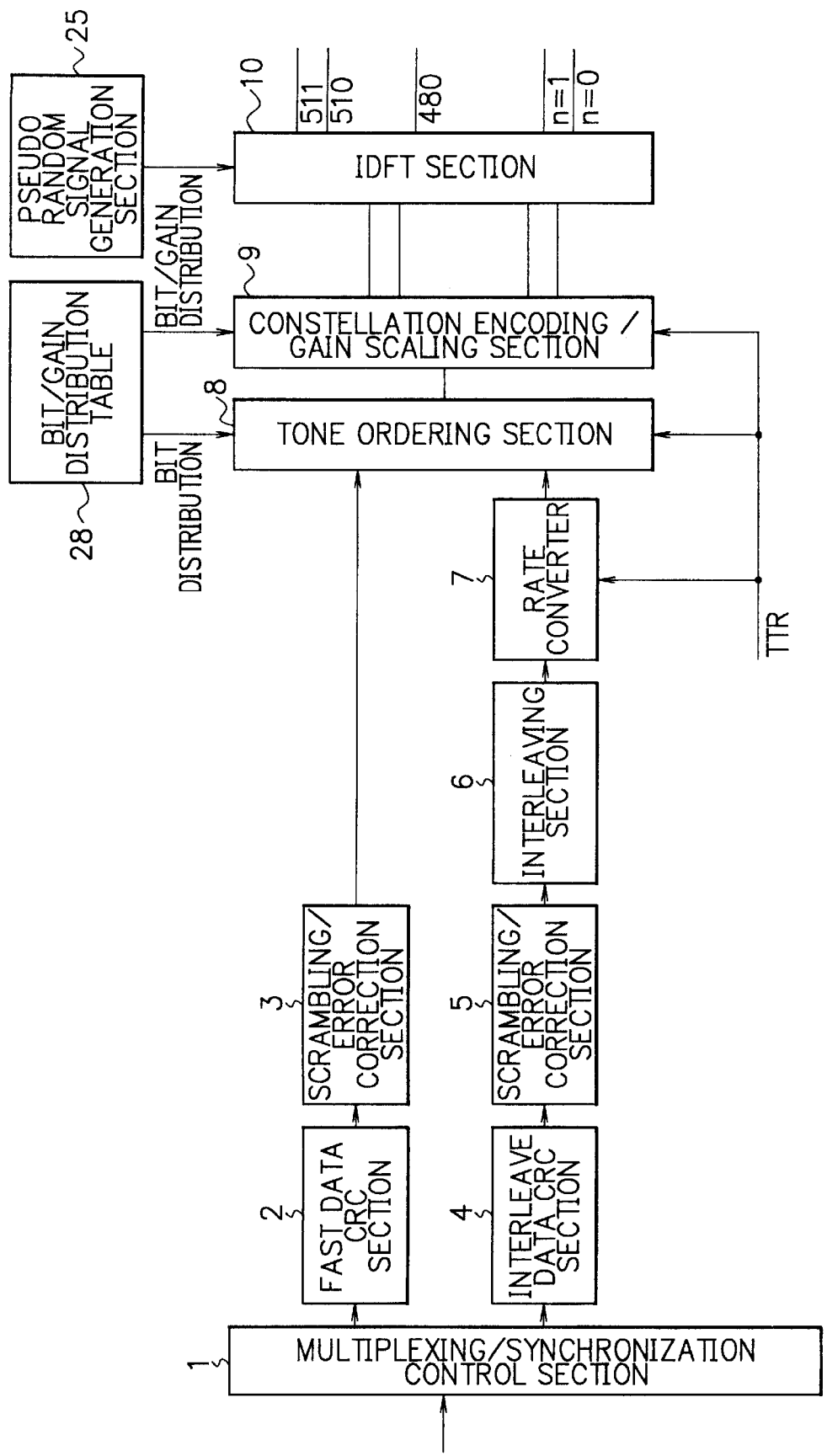
FIG. 9 is a block diagram showing the composition of an ATU transmitter as a data transmission device according to an embodiment of the present invention.

FIG. 9 is a block diagram showing the composition of an ATU transmitter as a data transmission device according to an embodiment of the present invention. Referring to FIG. 9, the ATU transmitter of the embodiment includes a multiplexing/synchronization control section 1, a fast data CRC (Cyclic Redundancy Check) section 2, scrambling/error correction sections 3 and 5, an interleave data CRC section 4, an interleaving section 6, a rate converter 7, a tone ordering section 8, a constellation encoding/gain scaling section 9, and an IDFT (Inverse Discrete Fourier Transform) section 10. The components of the ATU transmitter shown in FIG. 9 are implemented by, for example, one or more DSPs (Digital Signal Processors) and appropriate software.

The multiplexing/synchronization control section 1 receives data (in which the ratio between the amount of fast data and the amount of interleave data is generally fixed according to initial settings) which are supplied from an upper layer device at a prespecified data rate, separates the data into fast data and interleave data, and supplies the fast data and the interleave data to a fast path (the upper path in FIG. 9) and an interleave path (the lower path in FIG. 9) respectively.

The fast path is provided with the fast data CRC section 2 and the scrambling/error correction section 3. In the fast path, the fast data CRC section 2 adds CRC code to the fast data supplied from the multiplexing/synchronization control section 1. The scrambling/error correction section 3 scrambles the fast data supplied from the fast data CRC section 2, adds Reed-Solomon error correction code to the scrambled fast data, and supplies the data to the tone ordering section 8.

The interleave path is provided with the interleave data CRC section 4, the scrambling/error correction section 5, the interleaving section 6 and the rate converter 7. Also in the interleave path, the interleave data CRC section 4 adds CRC code to the interleave data, and the scrambling/error correction section 5 executes the scrambling and the addition of error correction code. Thereafter, the interleaving section 6 in the interleave path changes the order of the interleave data supplied from the scrambling/error correction section 5 and thereby executes the interleaving, and sends the interleaved data to the rate converter 7. Incidentally, delay is caused by the interleaving process.

The rate converter 7 is provided with memory for temporarily storing interleave data, since the transmission data rate of the interleave data has to be changed depending on the level of the noise due to the TCM-ISDN line. The rate converter 7 changes the amount of interleave data to be supplied to the tone ordering section 8 depending on whether the noise due to the TCM-ISDN line is high or low, by recognizing the change of the noise level using the TTR (TCM-ISDN Timing Reference) signal which is in sync with the change of the data transmission direction in the TCM-ISDN line.

Figure 10:
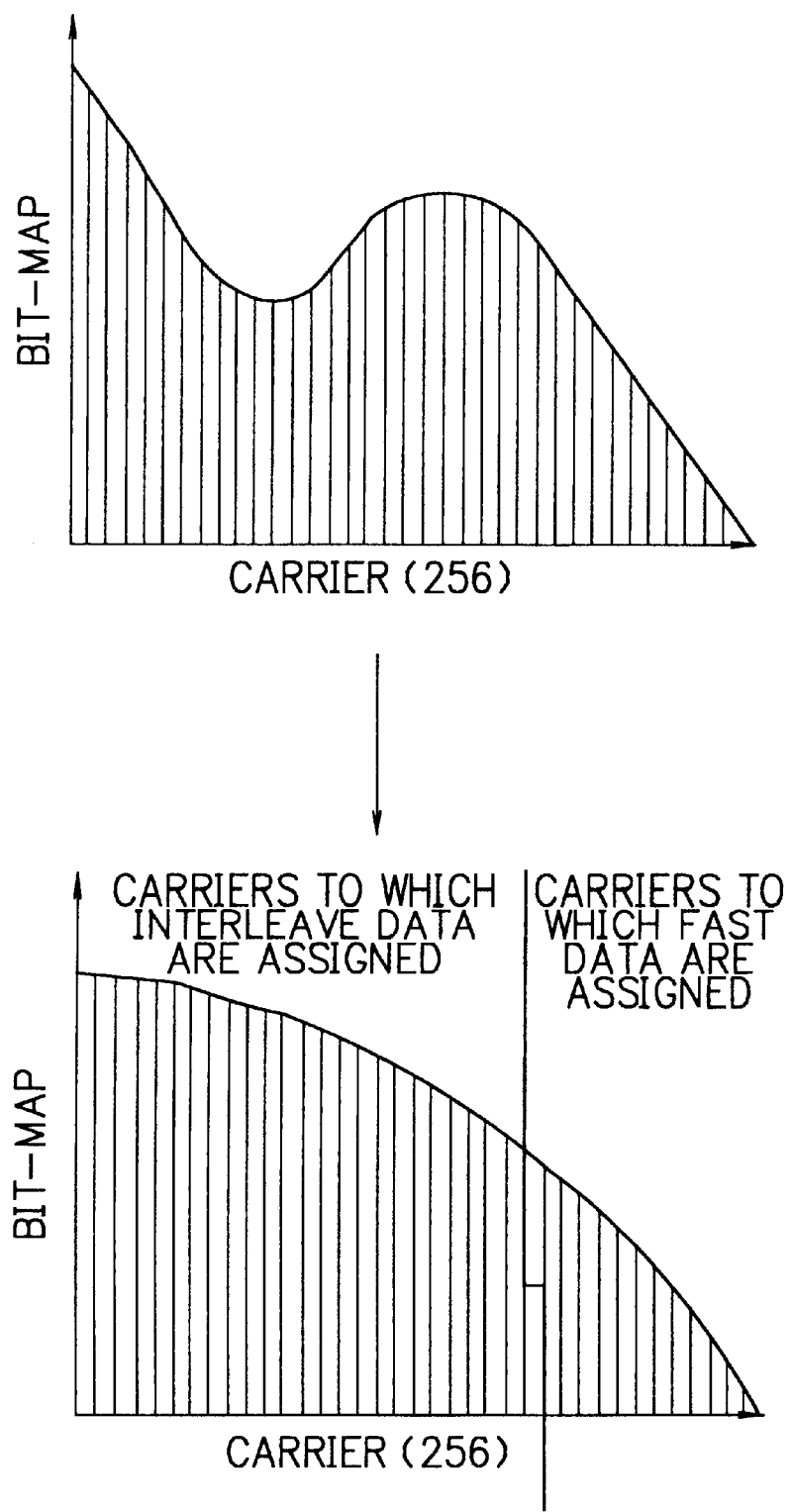
FIG. 10 is a bar graph showing assignment of fast data and interleave data to each carrier which is executed by a tone ordering section of the ATU transmitter of FIG. 9.

The tone ordering section 8 obtains the bit distribution information of each carrier (with respect to FEXT periods and with respect to NEXT periods) from the bit/gain distribution table 28, and thereby rearranges the carriers from the viewpoint of the number of bits which can be carried by the carrier (that is, obtains a new order of the carriers based on the number of assignable bits) as shown in FIG. 10. Referring to FIG. 10, a carrier that can carry the largest number of bits is placed at the left-hand end of FIG. 10, and a carrier that can carry the smallest number of bits is placed at the right-hand end of FIG. 10. The tone ordering section 8 assigns (distributes) the interleave data to the carriers starting from the carrier that can carry the largest number of bits, and assigns the fast data starting from the carrier that can carry the smallest number of bits, as shown in FIG. 10.

Figure 12:
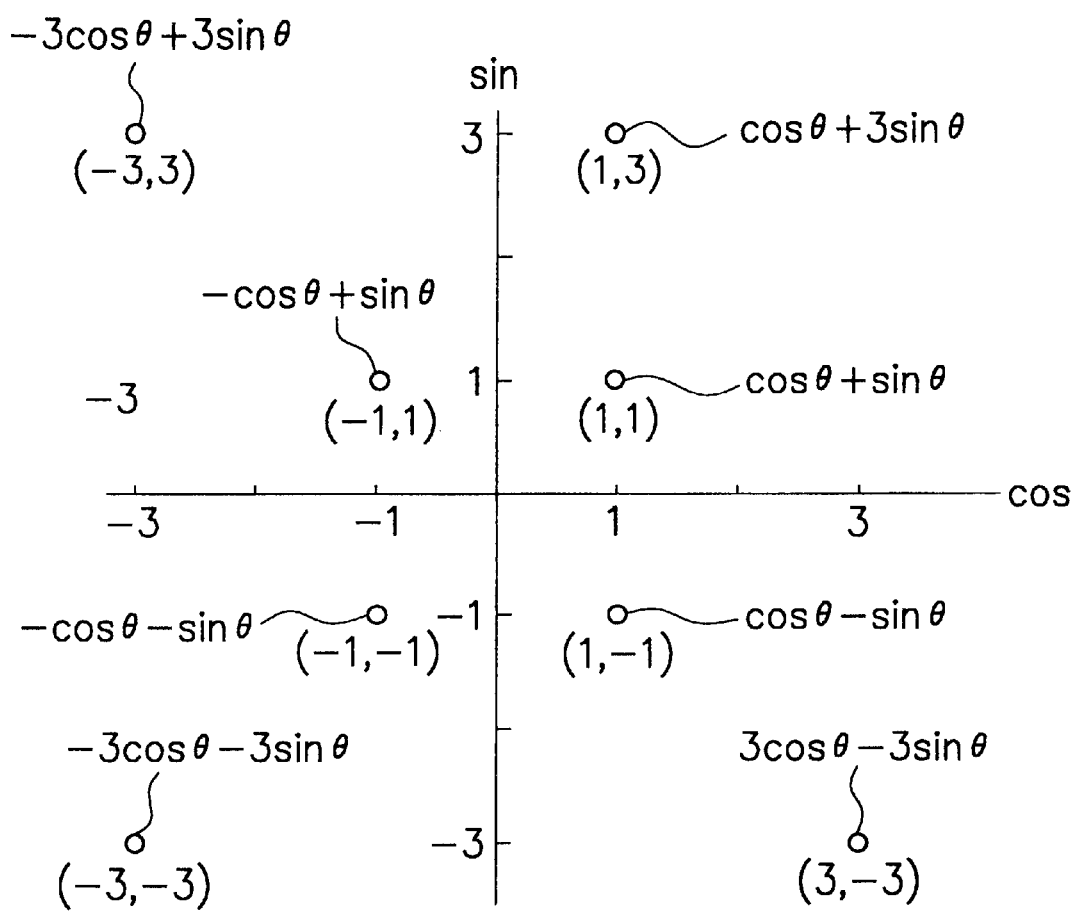
FIG. 12 is a graph showing the relationship between each position (A, B) in the 4-bit constellation of FIG. 11 and a trigonometric function (A cos θ+B sin θ)

The constellation encoding/gain scaling section 9 obtains the bit distribution onto the carriers and the gain distribution onto the carriers from the bit/gain distribution table 28. Thereafter, the constellation encoding/gain scaling section 9 refers to a constellation that corresponds to the number of bits which are assigned to each carrier according to the bit distribution. For example, in the case where 4 bits of data has been assigned by the tone ordering section 8 to a particular carrier according to the bit distribution, a constellation for 4-bit data (a 4-bit constellation) is prepared for the particular carrier and referred to. FIG. 11 is a schematic diagram showing two examples of constellations, in which a 4-bit constellation and a 5-bit constellation are shown. Subsequently, a gain scaling coefficient "g" is determined for each constellation corresponding to a carrier, according to the gain distribution information with regard to the carrier. Subsequently, with respect to each carrier, a position (i.e. coordinates (A, B)) in the constellation that corresponds to the bits (data) which have been assigned by the tone ordering section 8 to the carrier is found out, and the coordinates (A, B) is multiplied by the gain scaling coefficient "g". For example, in the case where 4-bit data "0101" has been assigned by the tone ordering section 8 to a particular carrier according to the bit distribution and the gain scaling coefficient "g" of the particular carrier should be set at 1.5 according to the gain distribution, the 4-bit constellation shown in FIG. 11 is referred to and thereby a position (coordinates (A, B)) corresponding to the 4-bit data "0101" (i.e. a number "5" in decimal digits) is found out (that is, (1, −1) in FIG. 11), and thereafter the coordinates (1, −1) are multiplied by the gain scaling coefficient 1.5, thereby coordinates (gA, gB)=(1.5, −1.5) corresponding to the 4-bit data "0101" are obtained as Fourier transform coefficients. Thereafter, the Fourier transform coefficients (gA, gB) with respect to each carrier are supplied to the IDFT section 10. Incidentally, FIG. 12 is a graph showing the relationship between each position (A, B) in the 4-bit constellation of FIG. 11 and a trigonometric function (A cos θ+B sin θ) as a Fourier component (before gain scaling) of a voltage signal V(t) which will be described below.

The IDFT section 10 which received the 512 Fourier transform coefficients with respect to the 256 carriers executes IDFT (Inverse Discrete Fourier Transform) to the coefficients and thereby obtains the aforementioned voltage signal V(t) which varies in time. The IDFT section 10 outputs 512 sampled voltages of the voltage signal V(t) (i.e. V(t) corresponding to 512 times "t" in a symbol cycle) successively to the ADSL line.

Figure 13:
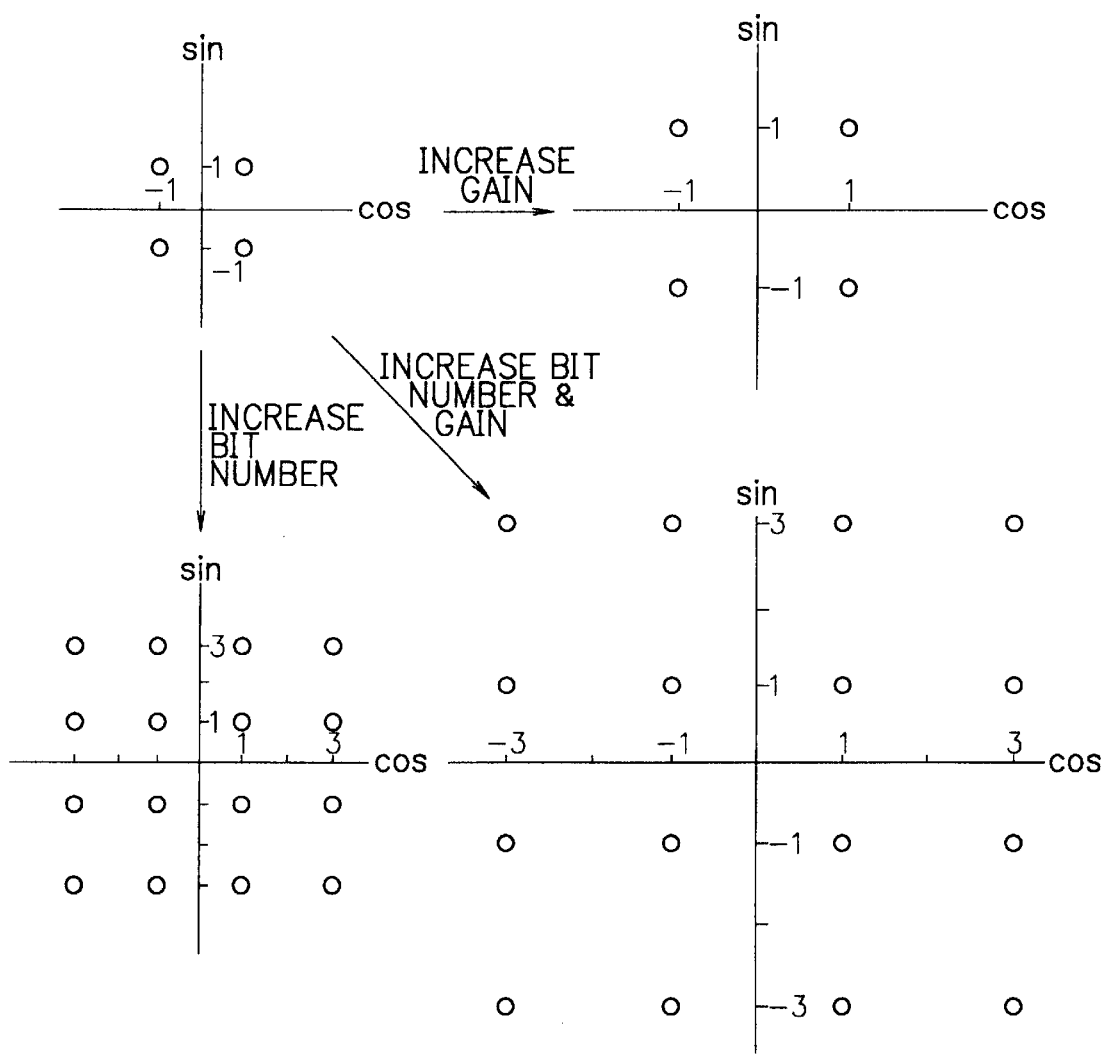
FIG. 13 is a graph for explaining the relationship between gain and noise.

Here, an explanation on the relationship between gain and noise will be given. FIG. 13 is a graph for explaining the relationship between gain and noise. As shown in FIG. 13, the distance between the origin and each point becomes large when gain is increased. When the number of transmitted bits becomes large as indicated by the downward arrows in FIG. 13, the probability of error due to noise is necessitated to be high if the bits are transmitted without raising the gain since the distance between points in the constellation is small. Therefore, even when the noise level is high, the probability of error due to noise can be reduced by raising the gain and increasing the distance between points in the constellation. Incidentally, information concerning the gain (i.e. the gain scaling coefficient "g") with respect to each carrier is transmitted to an ADSL transceiver unit on the receiving side.

Figure 3:
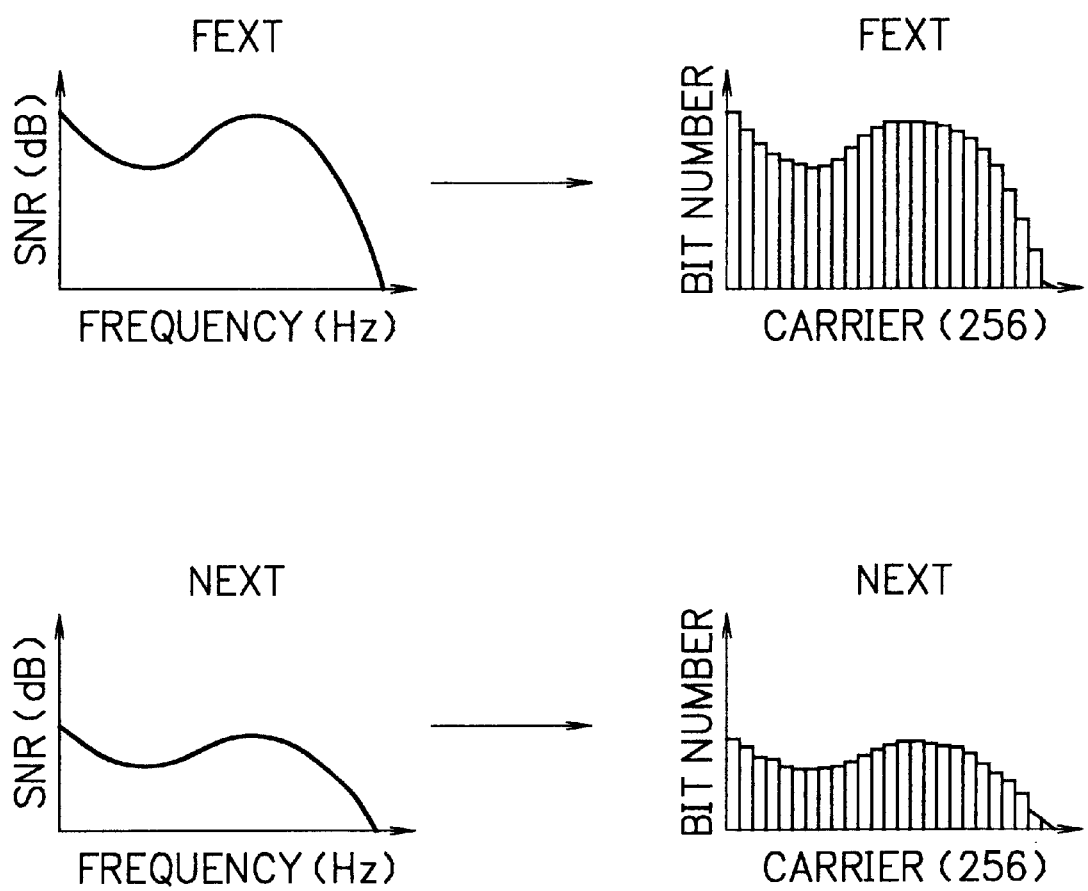
FIG. 3 is a graph showing an example of bit distribution.
Figure 4:
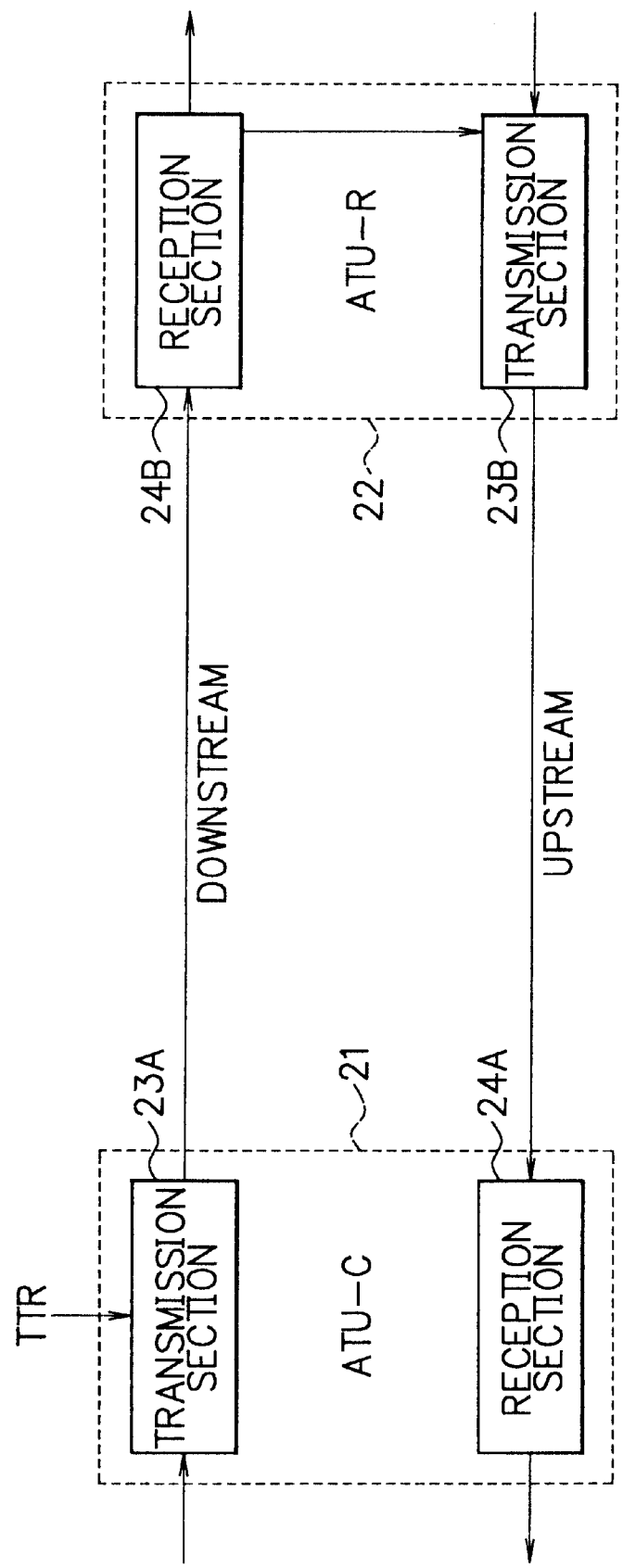
FIG. 4 is a block diagram showing an example of an ADSL data communication system.
Figure 5:
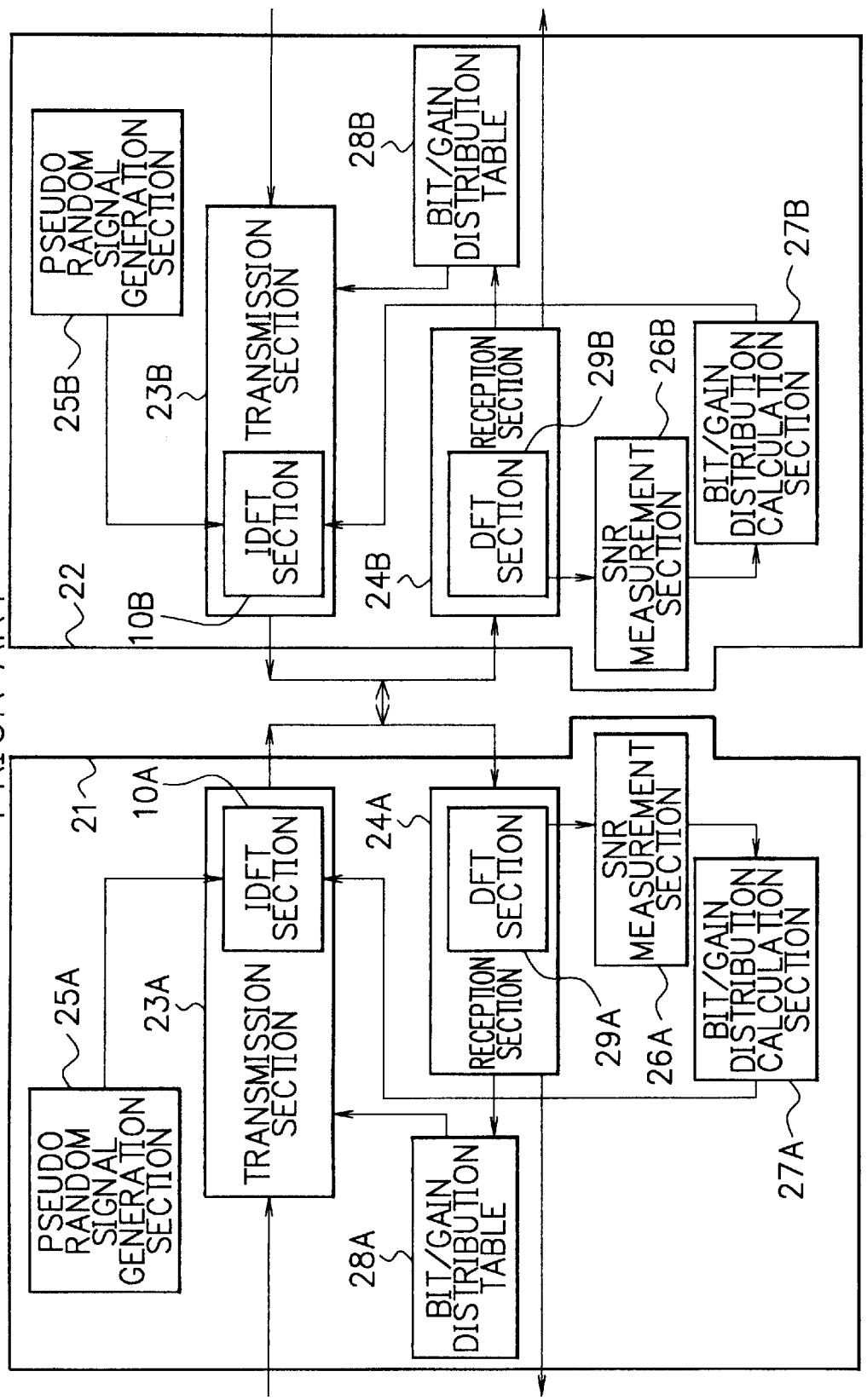
FIG. 5 is a block diagram showing the composition of an ATU-C and an ATU-R of the ADSL data communication system of FIG. 4.

The bit distribution and the gain distribution which are stored in and outputted by the bit/gain distribution table 28 can be obtained by the ADSL data communication system shown in FIG. 5, as described before in the "Description of the Prior Art". For example, the process executed by the ADSL data communication system of FIG. 5 for determining the bit/gain distribution in downstream data transmission is as follows. First, the ATU-C 21 shown in FIG. 5 outputs a pseudo random signal from its pseudo random signal generation section 25A. The pseudo random signal outputted by the pseudo random signal generation section 25A is supplied to the IDFT section 10A of the transmission section 23A and IDFT (Inverse Discrete Fourier Transform) is executed to the pseudo random signal. The pseudo random signal to which the IDFT has been executed is transmitted to the ATU-R 22 via the ADSL line. The pseudo random signal (to which the IDFT has been executed and which has been transferred to the ATU-R 22) is received by the reception section 24B of the ATU-R 22, and the signal is supplied to the DFT section 29B. The DFT section 29B executes DFT (Discrete Fourier Transform) to the pseudo random signal (to which the IDFT has been executed and which has been transferred to the ATU-R 22) and thereby obtains a received pseudo random signal which includes all the carriers (256 carriers, for example). The SNR measurement section 26B obtains the SNR of each carrier based on the received pseudo random signal including all the carriers. The measurement of SNR is executed both with respect to NEXT periods and with respect to FEXT periods. The SNR of each carrier with respect to NEXT periods and the SNR of each carrier with respect to FEXT periods which have been obtained by the SNR measurement section 26B are supplied to the bit/gain distribution calculation section 27B, and the bit/gain distribution calculation section 27B calculates the bit distribution and the gain distribution of the carriers with respect to NEXT periods and FEXT periods as shown in FIG. 3. The bit/gain distribution information of the carriers with respect to NEXT periods and FEXT periods which has been obtained by the bit/gain distribution calculation section 27B is transmitted by the transmission section 23B to the ATU-C 21 via the ADSL line. The ATUC 21 which received the bit/gain distribution information via the ADSL line stores the bit/gain distribution in the bit/gain distribution table 28A. The above process for determining the bit/gain distribution is executed in initialization (when data communication is started, for example), in the fast retraining period (defined in ITU standard), etc.

Figure 6:
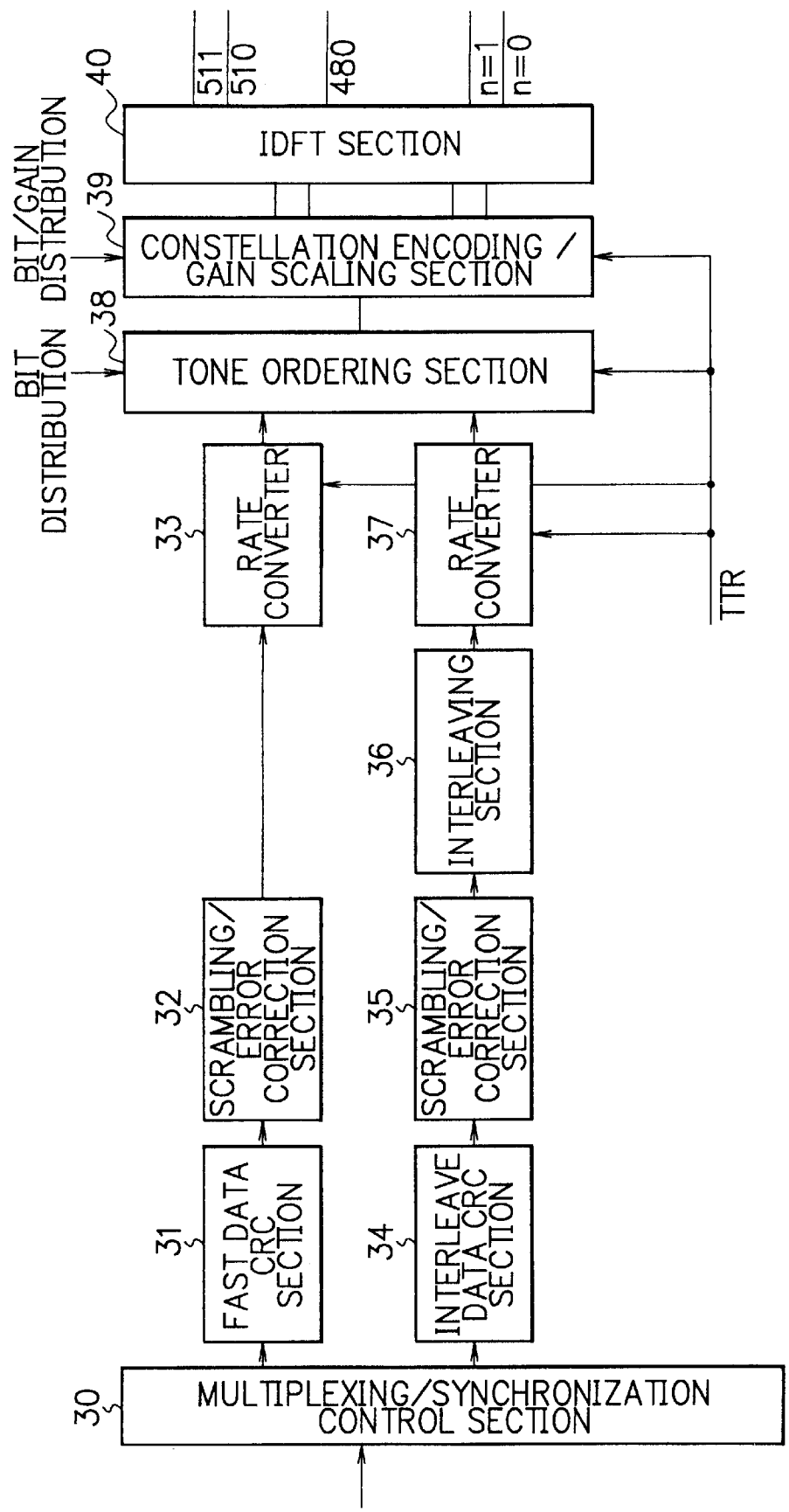
FIG. 6 is a block diagram showing the composition of a conventional ATU transmitter.
Figure 7:
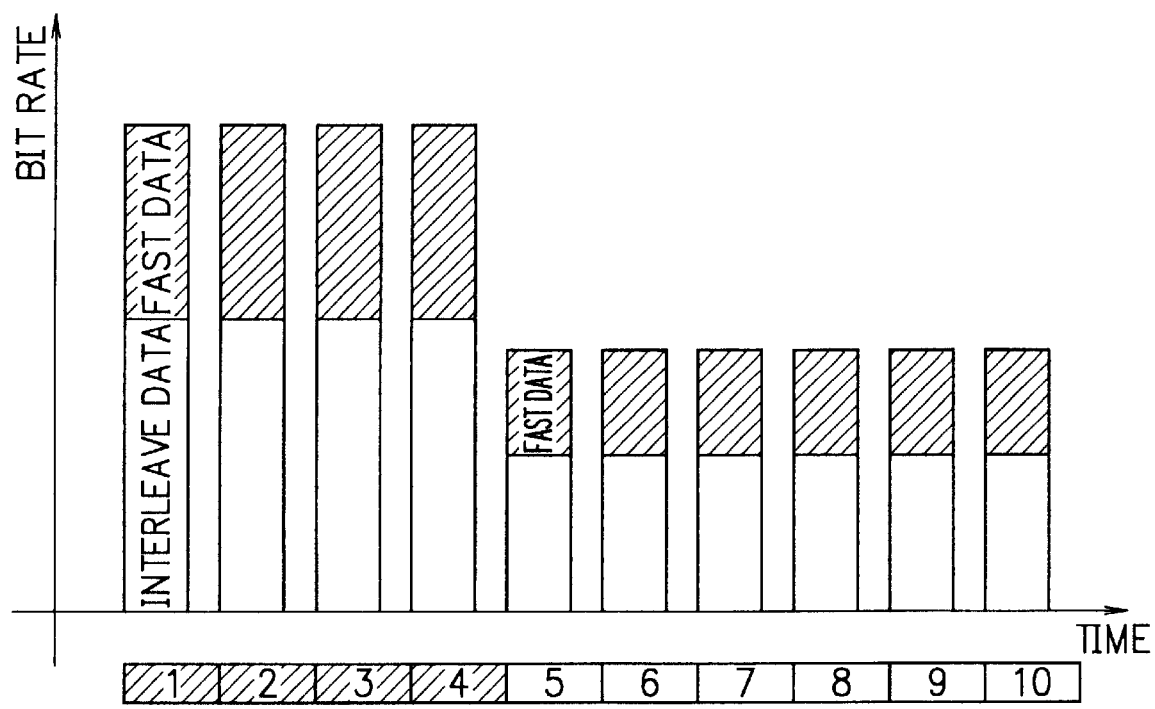
FIG. 7 is a bar graph showing the ratio between fast data and interleave data which are assigned to each symbol, in the case where a conventional dual bit-map method is employed.

The conventional ATU transmitter of FIG. 6 employing the conventional dual bit-map method sets the ratio between fast data and interleave data in one symbol (frame) at a fixed ratio, regardless of whether the symbol is a FEXT symbol (i.e. a symbol that is transmitted in the FEXT periods in which noise due to the adjacent line is low) or a NEXT symbol (i.e. a symbol that is transmitted in periods including the NEXT periods in which noise due to the adjacent line is high), as has been explained referring to FIG. 7. Therefore, when the number of FEXT symbols which can be transmitted in a FEXT period decreases (4 to 3, for example), the amount of transmitted fast data decreases, and thereby delay is caused in the transmission of fast data.

For example, in the TCM-ISDN, upstream data transmission (1.25 msec) and downstream data transmission (1.25 msec) are alternately executed, and thus the noise level due to crosstalk from the TCM-ISDN line to the ADSL line changes periodically with a noise cycle (FEXT/NEXT cycle) of 2.5 msec. Therefore, the ATU transmitter has to execute data transmission in sync with the change of the noise level. As explained before referring to FIG. 8, a little and various difference occurs between the timing when the data transmission direction is changed in the TCM-ISDN line and the timing when the amount of data transmitted by the ADSL line is changed based on the TTR signal in each FEXT/NEXT cycle. Therefore, the number of FEXT symbols which can be transmitted by the ATU transmitter in each FEXT/NEXT cycle changes between 3 and 4, thereby the amount of fast data transmitted in a fixed time period changes, and thereby delay due to buffering (temporarily storing data) is caused in the transmission of fast data. The delay of fast data has to be minimized since the delay is harmful to the fast data such as video data, voice data, data for real-time application software, etc.

FIG. 14 is a bar graph showing the assignment of fast data and interleave data to each symbol (frame) which is executed by the ATU transmitter according to the embodiment of the present invention. Referring to FIG. 14, the amount of fast data which are assigned to each symbol is fixed, regardless of whether the symbol is a NEXT symbol or a FEXT symbol. By such assignment, the amount of fast data which are transmitted in a fixed time period can be made constant, thereby the delay of fast data due to buffering (temporarily storing data) can be eliminated, and thereby the delay of the fast data (such as video data, voice data, data for real-time application software, etc. to which delay is harmful) can be minimized. Incidentally, by the constant assignment of the fast data, even if the number of FEXT symbols in each FEXT/NEXT cycle changed, the amount of fast data which are transmitted in each FEXT/NEXT cycle can be made constant, differently from the case of the conventional data transmission device shown in FIG. 7.

In the following, the operation of the ATU transmitter of FIG. 9 for implementing the data assignment explained above will be described in detail. Incidentally, in FIG. 9, a rate converter is not necessary in the fast path, since transmission data rate of the fast data is set constant in this embodiment regardless of the change of the noise level. On the other hand, the transmission data rate of the interleave data has to be changed depending on the change of the noise level, and thus the rate converter 7 is provided to the interleave path in order to control the data rate of interleave data which are supplied to the tone ordering section 8. The rate converter 7 sets the amount of interleave data to be supplied to the tone ordering section 8 at a smaller level in the NEXT periods (in which the noise due to the adjacent line is high), and sets the amount at a larger level in the FEXT periods (in which the noise due to the adjacent line is low), and sends the interleave data to the tone ordering section 8.

Data (in which the ratio between the amount of fast data and the amount of interleave data is generally fixed according to initial settings) are supplied from an upper layer device (such as a computer) to the ATU transmitter of FIG. 9 at a prespecified data rate. The data are separated by the multiplexing/synchronization control section 1 into fast data and interleave data, and the fast data and the interleave data are supplied to the fast path and the interleave path respectively. In the fast path, CRC code is added by the fast data CRC section 2 to the fast data, and the fast data outputted by the fast data CRC section 2 is scrambled by the scrambling/error correction section 3. The scrambling/error correction section 3 adds Reed-Solomon error correction code to the scrambled fast data, and supplies the data to the tone ordering section 8 without changing data rate. Also in the interleave path, CRC code is added by the interleave data CRC section 4 to the interleave data, and the scrambling and the addition of error correction code are executed by the scrambling/error correction section 5. Thereafter, the interleaving section 6 in the interleave path changes the order of the interleave data supplied from the scrambling/error correction section 5 and thereby executes the interleaving, and sends the interleaved data to the rate converter 7.

In the rate converter 7 of the interleave path, the amount of interleave data to be supplied to the tone ordering section 8 is set at a larger level for FEXT symbols which are transmitted in the FEXT periods (in which the noise due to the adjacent TCM-ISDN line is low), and the amount is set at a smaller level for NEXT symbols which are transmitted in periods including the NEXT periods (in which the noise due to the adjacent TCM-ISDN line is high).

For example, the rate converter 7 can execute the control on the amount of interleave data supplied to the tone ordering section 8, depending on whether it is in the FEXT periods or in the NEXT periods. Incidentally, in such control, a little delay due to processing by the tone ordering section 8, the constellation encoding/gain scaling section 9 and the IDFT section 10 is taken into consideration by the rate converter 7.

Or, it is also possible to let the rate converter 7 recognize the noise cycles (FEXT/NEXT cycles) (0~33) shown in FIG. 8 by use of the TTR signal supplied thereto, and grasp the changing timing between the FEXT symbols and NEXT symbols in each noise cycle, and thereby change the amount of interleave data to be supplied to the tone ordering section 8 in sync with the changing timing. Also in this example, a little delay due to processing by the tone ordering section 8, the constellation encoding/gain scaling section 9 and the IDFT section 10 is taken into consideration by the rate converter 7.

The tone ordering section 8 obtains the bit distribution information of each carrier (with respect to the FEXT periods and with respect to the NEXT periods) from the bit/gain distribution table 28, and rearranges the carriers from the viewpoint of the number of bits which can be carried by the carrier (that is, obtains a new order of the carriers based on the number of assignable bits) as shown in FIG. 10 (in which a carrier that can carry the largest number of bits is placed at the left-hand end, and a carrier that can carry the smallest number of bits is placed at the right-hand end) according to the bit distribution information. The above process is executed by the tone ordering section 8 with respect to the FEXT periods and the NEXT periods, in initialization (when data communication is started, for example), in the fast retraining period (defined in ITU standard), etc. The tone ordering section 8 assigns the interleave data to the carriers starting from the carrier that can carry the largest number of bits and assigns the fast data starting from the carrier that can carry the smallest number of bits as shown in FIG. 10, according to the above rearranged bit distribution with respect to the FEXT periods (for the FEXT symbols) or according to the above rearranged bit distribution with respect to the NEXT periods (for the NEXT symbols). In the assignment of the fast data and the interleave data to the carriers of a (FEXT or NEXT) symbol, the tone ordering section 8 keeps the amount of fast data included in the symbol constant (so as to match the amount of fast data supplied from the upper layer device to the ATU transmitter in each symbol cycle) regardless of whether the symbol is a FEXT symbol or a NEXT symbol, as shown in FIG. 14.

The constellation encoding/gain scaling section 9, which is supplied with the bit distribution information and the gain distribution information (with respect to the FEXT periods and the NEXT periods) from the bit/gain distribution table 28, figures out the Fourier transform coefficients (gA, gB) with respect to each carrier of the symbol (to each carrier of which data have been assigned by the tone ordering section 8), according to the method which has been described before. The process for obtaining the Fourier transform coefficients (gA, gB) with respect to each carrier of a symbol is executed based on different bit/gain distribution (the bit/gain distribution with respect to FEXT periods or the bit/gain distribution with respect to NEXT periods) depending on whether the symbol is a FEXT symbol or a NEXT symbol. The Fourier transform coefficients (gA, gB) with respect to each carrier of the symbol are supplied to the IDFT section 10.

The IDFT section 10 which received the 512 Fourier transform coefficients with respect to the 256 carriers of the symbol executes IDFT (Inverse Discrete Fourier Transform) to the coefficients, thereby obtains the voltage signal V(t) corresponding to the symbol, and outputs 512 sampled voltages of the voltage signal V(t) (i.e. V(t) corresponding to 512 times "t" in a symbol cycle) successively to the ADSL line.

As described above, in the ATU transmitter according to the embodiment of the present invention, the amount of fast data which are assigned to each symbol to be transmitted is set constant, regardless of whether the symbol is a FEXT symbol or a NEXT symbol. Therefore, the amount of fast data which are transmitted in a fixed time period can be made constant, thereby the delay of fast data due to buffering (temporarily storing data) can be eliminated, and thereby the delay of the fast data such as video data, voice data, data for real-time application software, etc. to which delay is harmful can be minimized. By the constant assignment of the fast data, the effect of the change of the number of FEXT symbols in each FEXT/NEXT cycle (that is, the change of the amount of fast data which are transmitted in each FEXT/NEXT cycle) is also eliminated, differently from the case of the conventional data transmission device shown in FIG. 7.

As set forth hereinabove, in the data transmission device and the data transmission method according to the present invention, data transmission is executed setting the amount of fast data which are assigned to each transmitted frame (symbol) at a constant amount even if the amount of data (fast data+interleave data) which can be assigned to each frame changed due to the periodic change of the noise level. Therefore, the amount of fast data which are transmitted in a fixed time period can be made constant, and thereby delay of the fast data (such as video data, voice data, data for real-time application software, etc. to which delay is harmful) can be minimized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, the data transmission device according to the present invention is not limited to ATU (ADSL Transceiver Unit) transmitters, but can also be applied to various types of transmitters of XTUs (XDSL Transceiver Units) which are used for data communication according to XDSL (X Digital Subscriber Line (X: A (Asymmetric), S (Symmetric), V (Very high speed), etc.)). The present invention can be applied to various types of data transmission devices which are employed for data communication in environments where the noise level (by any causes including causes other than TCM-ISDN lines) changes periodically. The present invention can also be applied to data transmission devices which employs modulation/demodulation methods other than DMT (Discrete Multi-Tone). Further, the present invention is not limited to wire data transmission devices, but can also be applied to data transmission devices which execute data transmission by radio waves. Moreover, while the above explanation has been given on the assumption that "fast data" means video data, voice data, data for real-time application software, etc., the classification of data into the "fast data" and the "interleave data" can be done in various ways depending on design requirements etc.

What is claimed is:

1. A data transmission device which executes data transmission in environments where the noise level changes periodically, comprising: means for transmitting data by setting an amount of fast data which are assigned to each frame at a constant non-zero amount when fast data are being transmitted even if an amount of data assigned to each frame changes due to the periodic change of the noise level, means for controlling the amount of interleave data which are assigned to each frame to be transmitted, based on the change of the amount of data which are assigned to each frame due to the periodic change of the noise level.

2. A data transmission device which executes data transmission in environments where the noise level changes periodically, wherein data transmission is executed setting an amount of fast data which are assigned to each frame at a constant non-zero amount when fast data are being transmitted even if an amount of data assigned to each frame changes due to the periodic change of the noise level, wherein the data transmission device is a device which executes data transmission using multi-carrier, comprising:

a separation means for receiving data which are supplied from an upper layer device at a fixed data rate including fast data and interleave data at a prespecified ratio, and separating the data into the fast data and the interleave data;

an interleaving means for executing interleaving to the interleave data which have been separated by the separation means;

an interleave data rate control means for controlling the data rate of the interleave data according to the periodic change of the noise level;

a tone ordering means for assigning the fast data to the carriers of the frame starting from a carrier that can carry the smallest number of bits so that the amount of the fast data included in the frame will be the constant amount and assigning the interleave data to the carriers of the frame starting from a carrier than can carry the largest number of bits, based on pre-obtained bit distribution of the multi-carrier with respect to low noise periods or with respect to high noise periods depending on whether the frame is a frame that is transmitted in the low noise periods or a frame that is transmitted in periods including the high noise periods;

a coefficient conversion means for converting data which have been assigned by the tone ordering means to each carrier of the frame into corresponding coefficients, based on the preobtained bit distribution and preobtained gain distribution of the multi-carrier with respect to the low noise periods or with respect to the high noise periods depending on whether the frame is a frame that is transmitted in the low noise periods or a frame that is transmitted in periods including the high noise periods; and a transform means for transforming the coefficients with respect to the carriers of the frame into a signal which varies in time.

3. A data transmission device as claimed in claim 2, wherein the transform means is an IDFT (Inverse Discrete Fourier Transform) means for executing inverse discrete Fourier transform to Fourier transform coefficients with respect to the carriers of the frame which have been obtained by the coefficient conversion means and thereby obtaining the signal which varies in time.

4. A data transmission device as claimed in claim 2, further comprising:

a fast data CRC (Cyclic Redundancy Check) means for executing the cyclic redundancy check and adding CRC code to the fast data which have been separated by the separation means;

a first scrambling/error correction means for scrambling the fast data supplied from the fast data CRC means and adding error correction code to the scrambled fast data;

an interleave data CRC means for executing the cyclic redundancy check and adding CRC code to the interleave data which have been separated by the separation means; and a second scrambling/error correction means for scrambling the interleave data supplied from the interleave data CRC means and adding error correction code to the scrambled interleave data.

5. A data transmission device which executes data transmission in environments where the noise level changes periodically, wherein data transmission is executed setting an amount of fast data which are assigned to each frame at a constant non-zero amount when fast data are being transmitted even if an amount of data assigned to each frame changes due to the periodic change of the noise level, wherein the data transmission device is an ATU (ADSL (Asymmetric Digital Subscriber Line) Transceiver Unit) transmitter which is used as a data transmitter of an ATU (ADSL Transceiver Unit).

6. A data transmission method for transmitting data in environments where the noise level changes periodically, comprising the step, when transmitting fast data, of setting an amount of the fast data which are assigned to each frame at a constant non-zero amount even if an amount of data assigned to each frame changes due to the periodic change of the noise level, wherein the amount of interleave data which are assigned to each frame to be transmitted is controlled, based on the change of the amount of data which are assigned to each frame due to the periodic change of the noise level.

7. A data transmission method for transmitting data in environments where the noise level changes periodically, comprising the step, when transmitting fast data, of setting an amount of the fast data which are assigned to each frame at a constant non-zero amount even if an amount of data assigned to each frame changes due to the periodic change of the noise level, wherein the data transmission is executed using multi-carrier and the data transmission method comprises the steps of:

a separation step in which data, which are supplied from an upper layer device at a fixed data rate including fast data and interleave data at a prespecified ratio, are separated into the fast data and the interleave data;

an interleaving step in which interleaving is executed to the interleave data which have been separated in the separation step;

an interleave data rate control step in which the data rate of the interleave data is controlled according to the periodic change of the noise level;

a tone ordering step in which the fast data are assigned to the carriers of the frame starting from a carrier that can carry the smallest number of bits so that the amount of the fast data included in the frame will be the constant amount, and the interleave data are assigned to the carriers of the frame starting from a carrier that can carry the largest number of bits, based on preobtained bit distribution of the multi-carrier with respect to low noise periods or with respect to high noise periods depending on whether the frame is a frame that is transmitted in the low noise periods or a frame that is transmitted in periods including the high noise periods;

a coefficient conversion step in which data which have been assigned to each carrier of the frame in the tone ordering step are converted into corresponding coefficients, based on the preobtained bit distribution and preobtained gain distribution of the multi-carrier with respect to the low noise periods or with respect to the high noise periods depending on whether the frame is a frame that is transmitted in the low noise periods or a frame that is transmitted in periods including the high noise periods; and a transform step in which the coefficients with respect to the carriers of the frame are transformed into a signal which varies in time.

8. A data transmission method as claimed in claim 7, wherein the transform step is an IDFT (Inverse Discrete Fourier Transform) step in which the inverse discrete Fourier transform is executed to Fourier transform coefficients with respect to the carriers of the frame which have been obtained in the coefficient conversion step and thereby the signal which varies in time is obtained.

9. A data transmission method as claimed in claim 7, further comprising the steps of:

a fast data CRC (Cyclic Redundancy Check) step in which the cyclic redundancy check and addition of CRC code are executed to the fast data which have been separated in the separation step;

a first scrambling/error correction step in which the fast data as the result of the fast data CRC step are scrambled and error correction code is added to the scrambled fast data;

an interleave data CRC step in which the cyclic redundancy check and addition of CRC code are executed to the interleave data which have been separated in the separation step; and a second scrambling/error correction step in which the interleave data as the result of the interleave data CRC step are scrambled and error correction code is added to the scrambled interleave data.

10. A data transmission method for transmitting data in environments where the noise level changes periodically, comprising the step, when transmitting fast data, of setting an amount of the fast data which are assigned to each frame at a constant non-zero amount even if an amount of data assigned to each frame changes due to the periodic change of the noise level, wherein the data transmission method is applied to an ATU (ADSL (Asymmetric Digital Subscriber Line)

Transceiver Unit) transmitter which is used as a data transmitter of an ATU (ADSL Transceiver Unit).

11. A computer-readable record medium storing a program for instructing a computer or a DSP (Digital Signal Processor) of a data transmission device to execute a process for transmitting data, wherein data transmission is executed setting an amount of fast data which are assigned to each frame at a constant non-zero amount when fast data are being transmitted even if an amount of data assigned to each frame changes due to a periodic change of the noise level, wherein in the process, the amount of interleave data which are assigned to each frame to be transmitted is controlled, based on the change of the amount of data which are assigned to each frame due to the periodic change of the noise leve.

12. A computer-readable record medium storing a program for instructing a computer or a DSP (Digital Signal Processor) of a data transmission device to execute a process for transmitting data, wherein data transmission is executed setting an amount of fast data which are assigned to each frame at a constant non-zero amount when fast data are being transmitted even if an amount of data assigned to each frame changes due to a periodic change of the noise level, wherein the data transmission is executed in the process using multi-carrier, and the process comprises the steps of:

a separation step in which data, which are supplied from an upper layer device at a fixed data rate including fast data and interleave data at a prespecified ratio, are separated into the fast data and the interleave data;

an interleaving step in which interleaving is executed to the interleave data which have been separated in the separation step;

an interleave data rate control step in which the data rate of the interleave data is controlled according to the periodic change of the noise level;

a tone ordering step in which the fast data are assigned to the carriers of the frame starting from a carrier that can carry the smallest number of bits so that the amount of the fast data included in the frame will be the constant amount, and the interleave data are assigned to the carriers of the frame starting from a carrier that can carry the largest number of bits, based on preobtained bit distribution of the multi-carrier with respect to low noise periods or with respect to high noise periods depending on whether the frame is a frame that is transmitted in the low noise periods or a frame that is transmitted in periods including the high noise periods;

a coefficient conversion step in which data which have been assigned to each carrier of the frame in the tone ordering step are converted into corresponding coefficients, based on the preobtained bit distribution and preobtained gain distribution of the multi-carrier with respect to the low noise periods or with respect to the high noise periods depending on whether the frame is a frame that is transmitted in the low noise periods or a frame that is transmitted in periods including the high noise periods; and a transform step in which the coefficients with respect to the carriers of the frame are transformed into a signal which varies in time.

13. A computer-readable record medium as claimed in claim 12, wherein the transform step is an IDFT (Inverse Discrete Fourier Transform) step in which inverse discrete Fourier transform is executed to Fourier transform coefficients with respect to the carriers of the frame which have been obtained in the coefficient conversion step and thereby the signal which varies in time is obtained.

14. A computer-readable record medium as claimed in claim 12, wherein the process further comprises the steps of:

a fast data CRC (Cyclic Redundancy Check) step in which the cyclic redundancy check and addition of CRC code are executed to the fast data which have been separated in the separation step;

a first scrambling/error correction step in which the fast data as the result of the fast data CRC step are scrambled and error correction code is added to the scrambled fast data;

an interleave data CRC step in which the cyclic redundancy check and addition of CRC code are executed to the interleave data which have been separated in the separation step; and a second scrambling/error correction step in which the interleave data as the result of the interleave data CRC step are scrambled and error correction code is added to the scrambled interleave data.

15. A computer-readable record medium storing a program for instructing a computer or a DSP (Digital Signal Processor) of a data transmission device to execute a process for transmitting data, wherein data transmission is executed setting an amount of fast data which are assigned to each frame at a constant non-zero amount when fast data are being transmitted even if an amount of data assigned to each frame changes due to a periodic change of the noise level, wherein the data transmission device is an ATU (ADSL (Asymmetric Digital Subscriber Line) Transceiver Unit) transmitter which is used as a data transmitter of an ATU (ADSL Transceiver Unit).

* * * * *